United States Patent
Sayeed et al.

(10) Patent No.: US 9,843,417 B2
(45) Date of Patent: Dec. 12, 2017

(54) DIFFERENTIAL MIMO TRANSCEIVER

(71) Applicant: Wisconsin Alumni Research Foundation, Madison, WI (US)

(72) Inventors: Akbar M. Sayeed, Madison, WI (US); John H. Brady, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 453 days.

(21) Appl. No.: 14/619,612

(22) Filed: Feb. 11, 2015

(65) Prior Publication Data

US 2017/0317854 A1    Nov. 2, 2017

(51) Int. Cl.
*H04B 7/02*   (2017.01)
*H04L 1/02*   (2006.01)
*H04L 1/06*   (2006.01)
*H04B 7/06*   (2006.01)

(52) U.S. Cl.
CPC .......... *H04L 1/0618* (2013.01); *H04B 7/0617* (2013.01); *H04B 7/0626* (2013.01); *H04B 7/0697* (2013.01)

(58) Field of Classification Search
CPC ... H04B 7/0617; H04B 7/0626; H04B 7/0697
See application file for complete search history.

(56) References Cited

U.S. PATENT DOCUMENTS

| | | | |
|---|---|---|---|
| 7,672,389 B2* | 3/2010 | Gueguen | H04L 1/0643 375/267 |
| 7,969,360 B2* | 6/2011 | Chevalier | G01S 3/48 342/417 |
| 2004/0192218 A1* | 9/2004 | Oprea | H04L 25/03343 455/73 |
| 2007/0253514 A1* | 11/2007 | Guevorkian | H04L 25/03038 375/350 |
| 2009/0323874 A1* | 12/2009 | Bastug | H04L 25/0226 375/350 |

* cited by examiner

*Primary Examiner* — Shuwang Liu
*Assistant Examiner* — Sung Ahn
(74) *Attorney, Agent, or Firm* — Bell & Manning, LLC

(57) ABSTRACT

A method of estimating a spatial filter matrix is provided. A conjugate of a received first signal defines a conjugate first signal. A Kronecker product of the defined first signal and a received second signal define a differential measurement signal. The computations are repeated for a plurality of first and second signals sufficient to compute an estimate of a channel matrix from the differential measurement signals. A spatial filter matrix is computed from the computed estimate of the channel matrix. The computed spatial filter matrix is used in a data communication phase between the first plurality of antennas and the second plurality of antennas.

20 Claims, 15 Drawing Sheets

US 9,843,417 B2

DIFFERENTIAL MIMO TRANSCEIVER

REFERENCE TO GOVERNMENT RIGHTS

This invention was made with government support under 1247583 awarded by the National Science Foundation and FA860-13-C-7351 awarded by the USAF/ESC. The government has certain rights in the invention.

BACKGROUND

In a multiple-input, multiple-output (MIMO) system multiple antennas are used at both the transmitter and the receiver to improve communication performance. MIMO techniques are a key enabler for high-capacity communication at high frequencies, such as millimeter-wave frequencies, that are being developed for emerging 5G wireless applications. Interference between multiple spatial data streams in MIMO systems is a limiting factor that necessitates the use of interference suppression. Linear interference suppression techniques are promising due to their simplicity. However, they generally require coherent channel estimation, which in turn requires the availability of a phase-coherent local oscillator at the receiver. The requirement of phase coherence between the transmitter and receiver is a stringent requirement at high frequencies, adding significant cost and complexity.

SUMMARY

In an example embodiment, a method of estimating a spatial filter matrix is provided. A first signal is received by a receiver from a first plurality of antennas. The first signal is a result of a first transmitted signal transmitted by a second plurality of antennas. A conjugate of the received first signal defines a conjugate first signal. A second signal is received by the receiver from the first plurality of antennas. The second signal is received after the first signal, and is a result of a second transmitted signal transmitted by the second plurality of antennas. A Kronecker product of the defined first signal and a received second signal define a differential measurement signal. The computations are repeated for a plurality of first and second signals sufficient to compute an estimate of a channel matrix from the differential measurement signals. A spatial filter matrix is computed from the computed estimate of the channel matrix. The computed spatial filter matrix is used in a data communication phase between the first plurality of antennas and the second plurality of antennas.

In another example embodiment, a receiver is provided that includes a processor configured to perform the method of estimating a spatial filter matrix.

In yet another example embodiment, a transmitter is provided that includes a processor configured to perform the method of estimating a spatial filter matrix, and to transmit a third signal to the second plurality of antennas. The third signal is precoded using the computed spatial filter matrix.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

DETAILED DESCRIPTION

Figure 1:
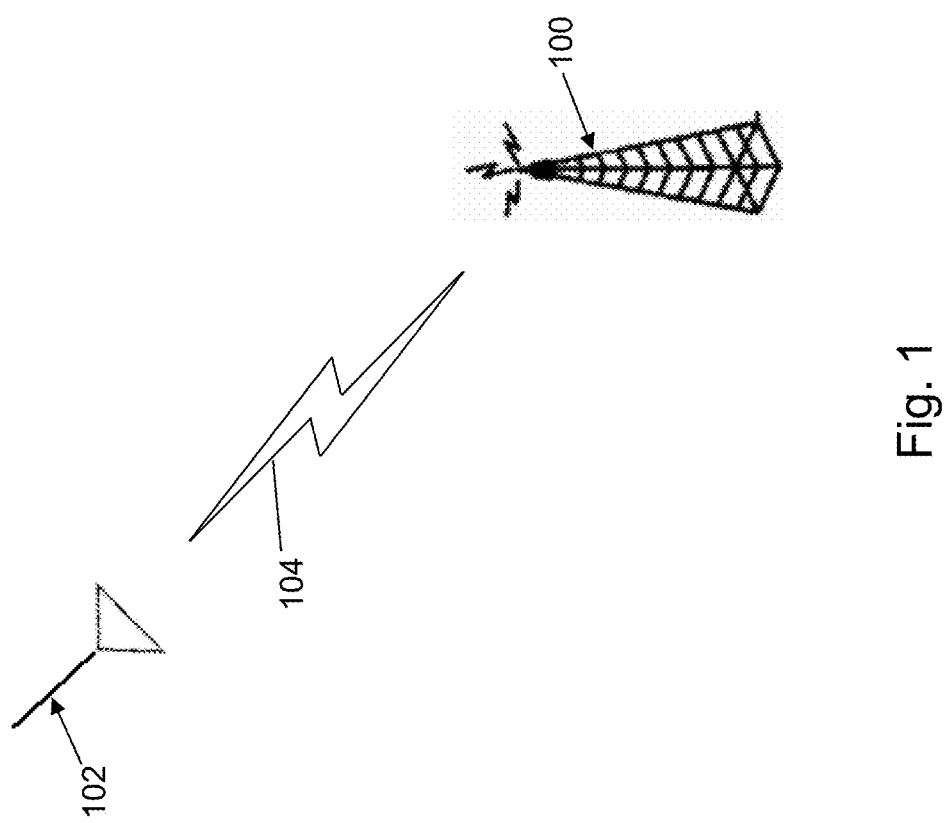
FIG. 1 depicts a communication scenario in accordance with an illustrative embodiment.

Referring to FIG. 1, in an illustrative communication system, there is a line-of-sight (LoS) path between a first transceiver 100 and a second transceiver 102 that represents clear spatial channel characteristics though first transceiver 100 and second transceiver 102 also may be linked in a multipath environment. For example, a signal 104 transmitted by second transceiver 102 is radiated towards first transceiver 100 on the LoS path. First transceiver 100 and second transceiver 102 support both the transmission and the reception of electromagnetic waves. Use of the terms transmitter and receiver is to describe an example function that can be performed by each device. For purposes of discussion, second transceiver 102 is denoted as a transmitting transceiver or a transmitter, and first transceiver 100 is denoted as a receiving transceiver or receiver though each transceiver may be configured to support either or both functions. First transceiver 100 is illustrated as a base station of a communications system and second transceiver 102 is illustrated as a communications device that communicates with the base station such as a cell phone though this is merely for exemplification and is not intended to be limiting.

One or both of first transceiver 100 and second transceiver 102 may be mounted on moving objects such that a distance between the transceivers may change with time. As known to a person of skill in the art, the communication environment between first transceiver 100 and second transceiver 102 may fluctuate due to changes in environmental conditions such as weather, due to changes in interference sources, and due to movement between first transceiver 100 and second transceiver 102, which may change the multipath environment, any of which may cause a fluctuation in the received signal-to-noise ratio (SNR), signal-to-interference ratio (SIR), signal to interference and noise ratio (SINR), and/or communication channel characteristics, even where the transmission power and other signal characteristics such as frequency, pulsewidth, bandwidth, etc. remain unchanged.

Figure 2:
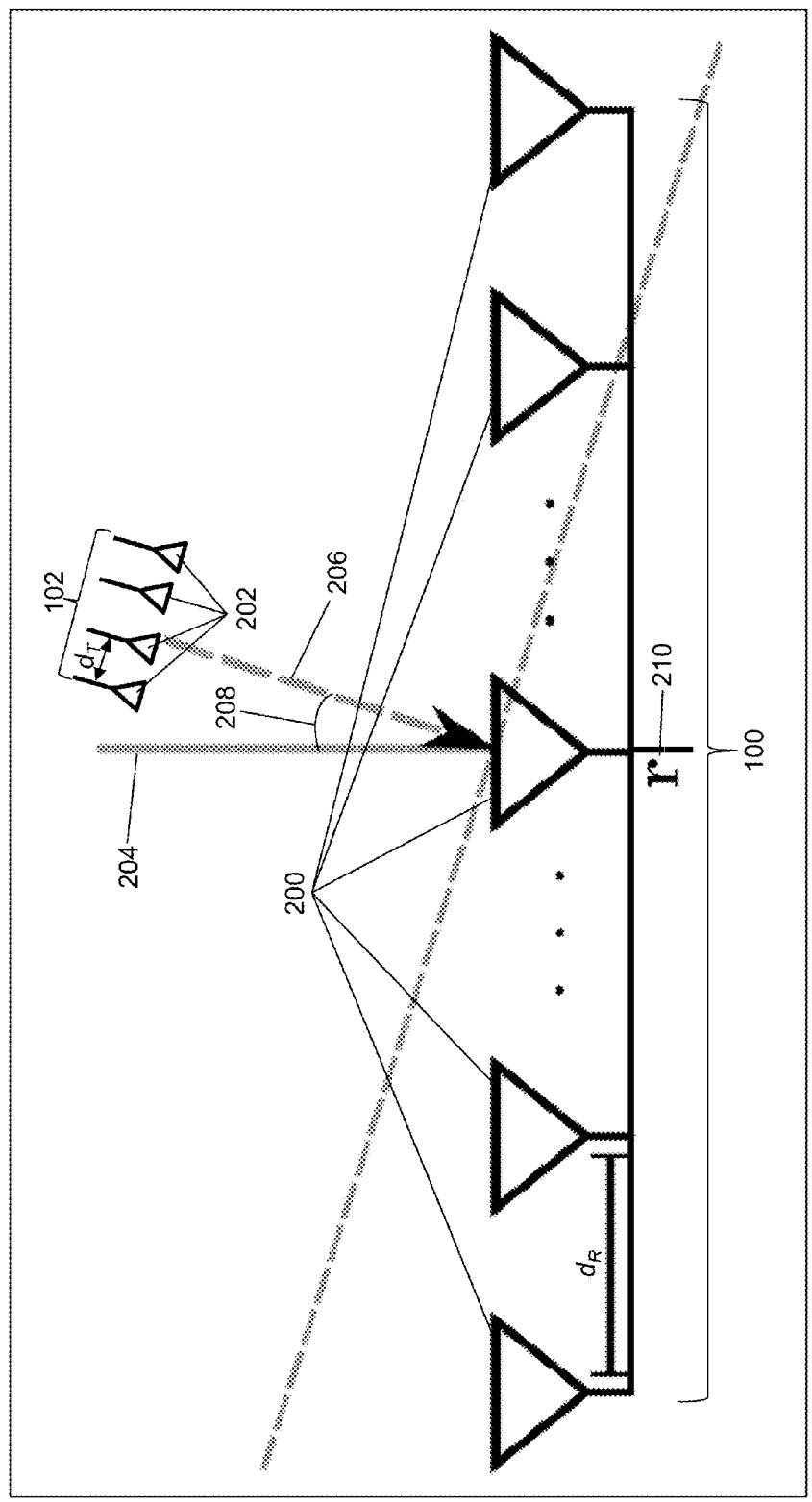
FIG. 2 depicts a transmitter and a receiver in a multiple-input, multiple-output (MIMO) system in accordance with an illustrative embodiment.

Referring to FIG. 2, first transceiver 100 may include a plurality of antennas 200 arranged to form an array. The array may be a uniform or a non-uniform linear array, a rectangular array, a circular array, a conformal array, etc. The plurality of antennas 200 are mounted in a common plane. An antenna of the plurality of antennas 200 may be a dipole antenna, a monopole antenna, a helical antenna, a microstrip antenna, a patch antenna, a fractal antenna, a feed horn, a slot antenna, etc. An antenna spacing, denoted $d_R$, may separate each of the plurality of antennas 200 from an adjacent antenna of the plurality of antennas 200 in the common plane. The plurality of antennas 200 are configured to receive an analog signal from second transceiver 102 and/or to radiate a plurality of radio waves toward second transceiver 102. The first plurality of antennas 200 may include any number of antennas where M denotes the number of antennas included in the first plurality of antennas 200.

Second transceiver 102 may include a second plurality of antennas 202 arranged to form a second array. The second array may be a uniform or a non-uniform linear array, a rectangular array, a circular array, a conformal array, etc. The second plurality of antennas 202 are mounted in a common plane. An antenna of the second plurality of antennas 202 may be a dipole antenna, a monopole antenna, a helical antenna, a microstrip antenna, a patch antenna, a fractal antenna, a feed horn, a slot antenna, etc. A second antenna spacing, denoted $d_T$, may separate each of the second plurality of antennas 202 from an adjacent antenna of the second plurality of antennas 202 in the common plane. The second plurality of antennas 202 are configured to receive an analog signal from first transceiver 100 and/or to radiate a plurality of radio waves toward first transceiver 100. The second plurality of antennas 202 may include any number of antennas where N denotes the number of antennas included in the second plurality of antennas 202.

A boresight vector 204 extends from a center of the array of first transceiver 100 perpendicular to the common plane in which the plurality of antennas 200 is mounted. Second transceiver 102 is located along a direction vector 206 which defines an angle 208, which may be denoted $\phi_O$, relative to boresight vector 204. For illustration, $\phi_O$ represents only the azimuth angle relative to a linear array. Alternative embodiments can be extended to two-dimensional arrays in which the angle $\phi_O$ is replaced by a pair of angles representing the azimuth angle and the elevation angle.

In an illustrative embodiment, first transceiver 100 and second transceiver 102 are configured to support differential communication. Differential communication is typically used when a phase-coherent local oscillator is not available at the receiver, resulting in an unknown phase offset between the transmitter and receiver, and possibly even a small frequency offset. In a constant modulus constellation, the transmitted symbols may be of the form $s=Ae^{j\phi}$ for some given fixed A. Let A=1 for simplicity. In a differential communication system, information is typically encoded in a phase difference $\Delta\phi$ between a current transmit symbol $s=s(t)$ and a previous transmit symbol $s_T=s(t-T)$ where T is a symbol period; that is, $$s = Ae^{j\phi} = e^{j\Delta\phi}s_T; s_T = Ae^{j\phi_T}. \quad (1)$$

Assuming that the differential symbols $\Delta\phi$ are chosen randomly from a symmetric constellation, such as in a communication system that uses quadrature phase shift keying (QPSK), and are independent across time, it follows that $e^{j\Delta\phi}$ is zero mean and independent of $s_T$. Under these assumptions, the following can be shown:

$$E[s_T]=0; E[s]=E[e^{j\phi}]E[s_T]=0$$

$$|s|^2=|s_T|^2=A^2=1$$

$$ss^*_T=e^{j\Delta\phi}|s_T|^2; E[ss_T^*]=0. \quad (2)$$

This also specifies the second-order statistics of the entire sequence of symbols, under the assumption that the starting symbol, $s_O$, at time zero satisfies $E[s_O]=0$ and $E[|s_O|^2]=A^2=1$, which is readily satisfied. The received signals r 210 and the differential measurements are $$r=e^{j\phi_O}s+v; r_T=e^{j\phi_O}s_T+v_T \quad (3)$$

$$rr^*_T=ss^*_T+sv^*_T+vs^*_T+vv^*_T=e^{j\Delta\phi}+w, \quad (4)$$

where v and $v_T$ represent noise, and it is assumed that the unknown phase offset $\phi_O$ remains constant, or varies sufficiently slowly over consecutive symbols to enable the detection of the differentially encoded symbols $\Delta\phi$ from $rr^*_T$ in equation (4).

Given a general nxn MIMO system where N=M=n such that second transceiver 102 and first transceiver 100 both include n antennas, the two transmitted signal vectors for the current symbol and the previous symbol corresponding to n differential symbols can be defined as $\Delta\phi=[\Delta\phi_1,\Delta\phi_2, \ldots, \Delta\phi_n]^T$ and $$s=[s_1,s_2, \ldots, s_n]^T \quad (5)$$

$$s(t)=[s_1(t),s_2(t), \ldots, s_n(t)]^T \quad (6)$$

$$s_T=[s_{1T},s_{2T}, \ldots, s_{nT}]^T \quad (7)$$

$$s(t-T) \quad (8)$$

$$[s_1(t-T),s_2(t-T), \ldots, s_n(t-T)]^T \quad (9)$$

The corresponding received signals r, $r_T$ may be defined similarly. The composite 2n×1 transmitted and received signal vectors may be defined as $$s_C = \begin{bmatrix} s \\ s_T \end{bmatrix}; r_C = \begin{bmatrix} r \\ r_T \end{bmatrix}. \quad (10)$$

The overall MIMO system equation for the two symbol vectors and the composite vector is $$r=Hs, r_T=H_Ts_T; r_C=H_Cs_C \quad (11)$$

where H=H(t) and $H_T$=H(t-T) and the 2n×2n composite channel matrix $H_C$ is given by $$H_C = \begin{bmatrix} H & 0 \\ 0 & H_T \end{bmatrix} \quad (12)$$

In differential communication, it is assumed that H=$H_T$; that is, the channel does not change across two symbol durations. The following differential measurements are possible at the receiver $$R_C = r_Cr_C^H = \begin{bmatrix} rr^H & rr_T^H \\ r_Tr^H & r_Tr_T^H \end{bmatrix} \quad (13)$$

Using equation (11), the system equation for these differential measurements at the receiver (without noise) is $$R_C=r_Cr_C^H=H_Cs_Cs_C^HH_C^H=H_CQ_CH_C^H \quad (14)$$

where $Q_C=s_Cs_C^H$ is of the same form as equation (13) for $r_Cr_C^H$ and represents the possibilities for differential transmission. Using equation (12) and expanding equation (14) results in $$R_C = \begin{bmatrix} rr^H & rr_T^H \\ r_Tr^H & r_Tr_T^H \end{bmatrix} = \begin{bmatrix} Hss^HH^H & Hss_T^HH_T^H \\ H_Ts_Ts^HH^H & H_Ts_Ts_T^HH_T^H \end{bmatrix}. \quad (15)$$

The matrix relation defined by equation (15) represents a fundamental set of equations for understanding MIMO communication and interference suppression under differential signaling. Another version can be obtained by vectorizing equation (14) as $$z_C = \text{vec}(R_C) = [H^*_C \otimes H_C]x_C, \ x_C = \text{vec}(Q_C) \quad (16)$$

where the following relation is used $$\text{vec}(ADB) = [B^T \otimes A]\text{vec}(D) \quad (17)$$

where $\otimes$ denotes a Kronecker product. A special case of equation (17) for vectors a and b is $$\text{vec}(ab^H) = [b^* \otimes a]\text{vec}(I_1) = b^* \otimes a. \quad (18)$$

A sub-system of equation (15) and equation (16) can be defined as $$rr_T^H = Hss_T H_T^H = Hss_T H^H, \quad (19)$$

where the assumption that $H = H_T$ is applied. Vectorizing equation (19) results in $$z = H_d x; \ H_d = [H^*_T \otimes H]$$

$$z = \text{vec}(rr_T^H)$$

$$x = \text{vec}(ss_T^H) \quad (20)$$

where $H_d$ is a differential-MIMO (D-MIMO) channel matrix. For n=2, $$rr_T^H = \begin{bmatrix} r_1 r_{1_T}^* & r_1 r_{2_T}^* \\ r_2 r_{1_T}^* & r_2 r_{2_T}^* \end{bmatrix}, \quad (21)$$

$$ss_T^H = \begin{bmatrix} s_1 s_{1_T}^* & s_1 s_{2_T}^* \\ s_2 s_{1_T}^* & s_2 s_{2_T}^* \end{bmatrix}, \quad (22)$$

$$z = \text{vec}(rr_T^H) = \begin{bmatrix} r_1 r_{1_T}^* \\ r_2 r_{1_T}^* \\ r_1 r_{2_T}^* \\ r_2 r_{2_T}^* \end{bmatrix}, \quad (23)$$

$$x = \text{vec}(ss_T^H) = \begin{bmatrix} s_1 s_{1_T}^* \\ s_2 s_{1_T}^* \\ s_1 s_{2_T}^* \\ s_2 s_{2_T}^* \end{bmatrix}, \text{ and}$$

$$H_d = H^*_T \otimes H = H^* \otimes H \quad (25)$$

$$= \begin{bmatrix} h_{11}^* & h_{12}^* \\ h_{21}^* & h_{22}^* \end{bmatrix} \otimes \begin{bmatrix} h_{11} & h_{12} \\ h_{21} & h_{22} \end{bmatrix}$$

$$= \begin{bmatrix} h_{11}^* H & h_{12}^* H \\ h_{21}^* H & h_{22}^* H \end{bmatrix}$$

$$= \begin{bmatrix} |h_{11}|^2 & h_{11}^* h_{12} & h_{12}^* h_{11} & |h_{12}|^2 \\ h_{11}^* h_{21} & h_{11}^* h_{22} & h_{12}^* h_{21} & h_{12}^* h_{22} \\ h_{21}^* h_{11} & h_{21}^* h_{12} & h_{22}^* h_{11} & h_{22}^* h_{12} \\ |h_{21}|^2 & h_{21}^* h_{22} & h_{22}^* h_{21} & |h_{22}|^2 \end{bmatrix}.$$

$H_d$ is full-rank, if H is full-rank, which follows from the properties of the Kronecker product: rank(A $\otimes$ B)=rank(A) rank(B). The first and last elements of z carry the information about the desired differential symbols, $\neq \phi_1$ and $\Delta \phi_2$, contained in the first and last elements of x. The remaining elements of z represent cross-terms that carry information about interference. If there is no inter-channel inference, H is diagonal, there is no interference in the differential system, and $H_d$ is diagonal. The off-diagonal entries of $H_d$ represent the interference between the transmitted signals in x (see equation (24)) that corrupt the receiver measurements in z (see equation (23)).

The noisy underlying system equations based on equation (11) can be defined as $$r = \sqrt{\rho} Hs + v; r_T = \sqrt{\rho} H_T s_T + v_T \quad (29)$$

$$rr_T^H = \rho Hss_T^H H_T^H + \sqrt{\rho} Hsv_T^H + \sqrt{\rho} v s_T^H H_T^H + vv_T^H \quad (30)$$

where $v \sim CN(0, \sigma_2 I_n)$ and $v_T \sim CM(0, \sigma^2 I_n)$ represent complex Gaussian noise vectors that are independent of each other, the signals are s and $s_T$, and $\rho$ represents a signal-to-noise ratio (SNR) for each data stream. Vectorizing equation (30) results in a noisy version of the D-MIMO system equation (20) and is defined as $$z = \rho H_d x + w \quad (31)$$

where $$w = w_1 + w_2 + w_3 = \text{vec}(\sqrt{\rho} Hsv_T^H + \sqrt{\rho} v s_T^H H_T^H + vv_T^H)., \quad (32)$$

$x = \text{vec}(ss_T^H)$ is the vector of transmitted differential symbols, $z = \text{vec}(rr_T^H)$ is a vector of received differential signals, and w is an effective noise vector that consists of the three terms indicated in equation (32).

A $n^2 \times n^2$ (4×4 for the illustrative case) matrix $F_O$ can be designed that operates on the vector z to yield estimates of x in which the interference has been suppressed:

$$x_{est} = F_O z. \quad (33)$$

$F_O$ can be defined using a minimum mean squared error (MMSE) criterion, assuming knowledge of the D-MIMO channel matrix $H_d$ as:

$$F_O = \text{argmin}_F E[\|x_{est} - x\|^2] = H_d^H (\rho^2 H_d H_d^H + \Sigma_W)^{-1} \quad (34)$$

where $\Sigma_W = E[ww^H]$ is a covariance matrix of w, and $H_d H_d^H = (H^*_T H_T^T \otimes HH^H)$. $\rho^2$ may know a priori in some cases or may be estimated as part of channel estimation using training signals as understood by a person of skill in the art. $F_O$ is a spatial filter matrix that is ($n^2 \times n^2$). The differentially encoded transmitted symbols in x can be estimated at the receiver by applying differential detectors, corresponding to the differential transmission scheme used, to the appropriate elements of $x_{est}$.

To characterize the second-order statistics of x and w in equation (31), zero-mean signal constellations for the differential symbols is assumed with different differential symbols assumed to be independent across time and data streams. This results in the following second-order statistics for s:

$$E[s] = E[s_T] = 0, \ E[ss^H] = 0 \quad (35)$$

$$E[ssH] = E[s_T s_T^H] = I_n \quad (36)$$

which in turn results in the following second-order statistics for $x=\text{vec}(ss_T^H)$ $$E[x]=E[\text{vec}(ss_T^H)]=\text{vec}(E[ss_T^H])=0$$

$$E[xx^H]=E[\text{vec}(ss_T^H)\text{vec}(ss_T^H)^H]=E[(s^*_T \otimes s)(s_T^T \otimes s^H)]=E[s^*s_T^T \otimes ss^H]=E[s^*s_T^T] \otimes E[ss^H]=I_n \otimes I_n=I_{n^2}. \quad (37)$$

Assuming that the signal and noise are independent, and using the assumptions on the statistics of $v$ and $v_T$, it can be shown that $$E[w]=0 \quad (38)$$

$$\Sigma_W=E[ww^H]=\rho\sigma^2(I_n \otimes HH^H)+\rho\sigma^2(H^*_T H_T^T \otimes I_n)+\sigma^4 I_{n^2} \quad (39)$$

where the three terms in $\Sigma_W$ in equation (39) represent the covariance matrices of the corresponding terms in equation (32), where $\sigma^2$ is a noise power.

The noise statistics follow from the following calculations on the joint statistics of $w_1$, $w_2$, and $w_3$ in equation (32). Using equation (18), $$w_1=\sqrt{\rho}\text{vec}(Hsv_T^H)=\sqrt{\rho}(v_T^* \otimes Hs) \quad (40)$$

$$w_2=\sqrt{\rho}\text{vec}(vs_T^H H_T^H)=\sqrt{\rho}(H_T^* s_T^* \otimes v) \quad (41)$$

$$w_3=\text{vec}(vv_T^H)=(v_T^* \otimes v). \quad (42)$$

The second-order statistics of $\{w_i\}$ are $$E[w_1]=\sqrt{\rho}(E[v^*_T] \otimes E[Hs])=0 \quad (43)$$

$$E[w_1 w_1^H]=\rho E[(v^*_T \otimes Hs)(v^*_T \otimes Hs)^H]=\rho E[(v^*_T v_T^T \otimes Hss^H H)]=\rho\sigma^2 E[v^*_T v_T^T] \otimes HE[ss^H]H^H=\rho\sigma^2 I_n \otimes HH^H. \quad (44)$$

Similarly, $$E[w_2]=E[w_3]=0 \quad (45)$$

$$E[w_2 w_2^H]=\rho\sigma^2(H_T^* H_T^H \otimes I_n) \quad (46)$$

$$E[w_3 w_3^H]=\sigma^2 I_n \otimes \sigma^2 I_n=\sigma^4 I_{n^2}. \quad (47)$$

It can further be similarly shown that $$E[w_1 w_2^H]=E[w_1 w_3^H]=E[w_2 w_3^H]=0. \quad (48)$$

Combining the above calculations leads to the second-order statistics of $w$ given in equation (39).

If $HH^H$ has the eigenvalue decomposition $HH^H=U\Lambda U^H$ and $H_T H_T^H$ has the eigenvalue decomposition $H_T H_T^H=U_T \Lambda_T U_T^H$, the noise covariance matrix $\Sigma_w$ has the eigenvalue decomposition $$\Sigma_w=(U^*_T \otimes U)\tilde{\Lambda}(U^*_T \otimes U)^H \quad (49)$$

$$\tilde{\Lambda}=\rho\sigma^2(\Lambda \oplus \Lambda_T)+\sigma^4 I_{n^2} \quad (50)$$

where $A \oplus B=(I \oplus A)+(B \oplus I)$ is the Kronecker sum.

$H_d$ can be estimated using training symbols as understood by a person of skill in the art. The estimated version of channel matrix $H_d$ is plugged into equation (34) to determine spatial filter matrix $F_O$. The training signals can be designed in a variety of ways. The simplest approach may be to design the transmitted signals so that only one entry of $x$ (see equation (24)) is non-zero in each differential training symbol; the corresponding column of $H_d$ can then be estimated from the corresponding received differential measurements $z$ (see equation (23). The training symbols that correspond to this simple approach are described below. For estimating the first column of $H_d$, the following may be transmitted $$s=s_T=\begin{bmatrix}1\\0\end{bmatrix} \quad (51)$$

resulting in $$x=\begin{bmatrix}1\\0\\0\\0\end{bmatrix}. \quad (52)$$

For estimating the second column of $H_d$, the following may be transmitted $$s=\begin{bmatrix}0\\1\end{bmatrix}, s_T=\begin{bmatrix}1\\0\end{bmatrix} \quad (53)$$

resulting in $$x=\begin{bmatrix}0\\1\\0\\0\end{bmatrix}. \quad (54)$$

For estimating the third column of $H_d$, the following may be transmitted $$s=\begin{bmatrix}1\\0\end{bmatrix}, s_T=\begin{bmatrix}0\\1\end{bmatrix} \quad (55)$$

resulting in $$x=\begin{bmatrix}0\\0\\1\\0\end{bmatrix}. \quad (56)$$

Finally, for estimating the fourth column of $H_d$, the following may be transmitted $$s=s_T=\begin{bmatrix}0\\1\end{bmatrix} \quad (57)$$

resulting in $$x=\begin{bmatrix}0\\0\\0\\1\end{bmatrix}. \quad (58)$$

From equation (39) estimates of $HH^H$ and $H^*_T H_T^T$ are used to estimate $\Sigma_w$ for $F_O$ in equation (34). For a case of interest, $H_T=H$, so that $$\text{vec}(HH^H)=[H^* \otimes H]\text{vec}(I)=H_d \text{vec}(I). \quad (59)$$

As a result, the two matrices $HH^H$ and $H^*_T H_T^T$ can be extracted from $H_d$.

Figure 3:
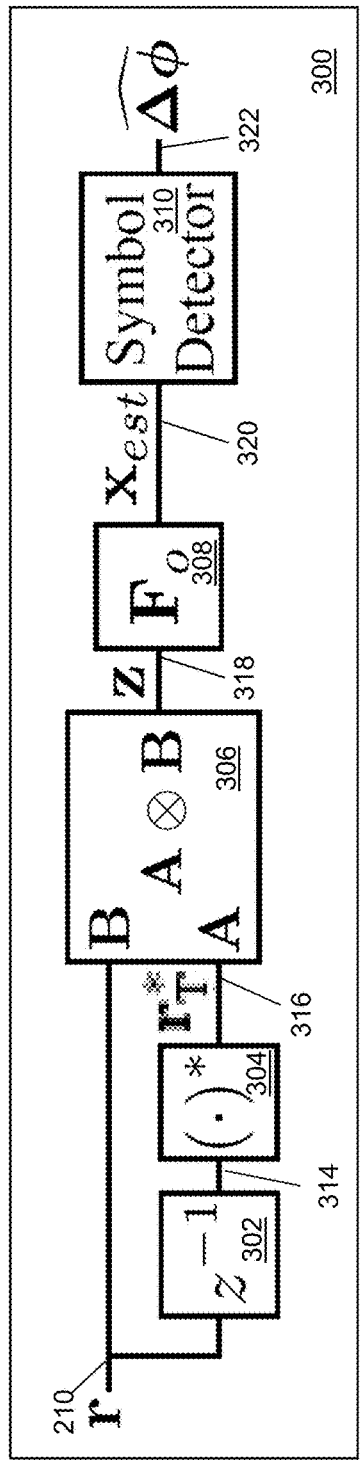
FIG. 3 depicts a block diagram of a receiver device in accordance with an illustrative embodiment.

Referring to FIG. 3, a block diagram of a receiver 300 that may be implemented at first transceiver 100 acting as a receiving transceiver is shown in accordance with an illustrative embodiment. Second transceiver 102 may include similar elements as understood by a person of skill in the art. Receiver 300 may be implemented to yield estimates of x, an estimate vector $x_{est}$, in which the interference has been suppressed by defining matrix $F_O$ that operates on the vector z as defined in equation (33). Receiver 300 may include a sample and hold operator 302, a conjugate operator 304, a Kronecker product operator 306, a spatial filter operator 308, and a symbol detector operator 310. Fewer, different, and additional components may be incorporated into receiver 300. For example, sample and hold operator 302 may be implemented with a delay line in an analog implementation rather than specifically a sample and hold circuit.

Sample and hold operator 302, conjugate operator 304, Kronecker product operator 306, spatial filter operator 308 and/or symbol detector operator 310 perform operations on a received signal r 210 to detect the differentially encoded symbol vector $\Delta\phi$ from $rr^*_T$. One or more of sample and hold operator 302, conjugate operator 304, Kronecker product operator 306, spatial filter operator 308 and/or symbol detector operator 310 may be implemented by a special purpose computer, logic circuits, or hardware circuits as understood by a person of skill in the art. Thus, one or more of the operators may be implemented using hardware, firmware, software, or any combination of these methods, depending on the stage at which the signal is converted from analog to digital form. Furthermore, some of these operators may be implemented in analog (passband) domain, or in the baseband domain. For example, one or more of sample and hold operator 302, conjugate operator 304, Kronecker product operator 306, spatial filter operator 308 and/or symbol detector operator 310 may be implemented in software (comprised of computer-readable and/or computer-executable instructions) stored in a computer-readable medium and accessible by a processor for execution of the instructions that embody the operations of the associated operator. The instructions may be written using one or more programming languages, assembly languages, scripting languages, etc.

A computer-readable medium is an electronic holding place or storage for information so the information can be accessed by the processor as understood by those skilled in the art. The computer-readable medium can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Controller 102 may have one or more computer-readable media that use the same or a different memory media technology. Receiver 300 may include one or more computer-readable media.

A processor performs operations as understood by those skilled in the art. A digital signal processor (DSP) is a type of processor that operates on digital signals. The processor may be implemented in hardware and/or firmware. The processor may execute an instruction, meaning the processor performs/controls the operations called for by that instruction. The term "execution" is the process of running an application or the carrying out of the operation called for by an instruction. The processor operably couples with the computer-readable medium to read, to store, and to process information. The processor may retrieve a set of instructions from a permanent memory device and copy the instructions in an executable form to a temporary memory device that is generally some form of RAM. Receiver 300 may include a plurality of processors that use the same or a different processing technology.

Sample and hold operator 302 samples and holds a copy of a previously received signal $r_T$ 314. Conjugate operator 304 may compute a complex conjugate of the sampled and held previously received signal $r_T$ 314 as a conjugate signal, $r^*_T$ 316. Kronecker product operator 306 computes a differential measurement signal z 318, $z=\text{vec}(rr_T^H)=r_T^* \otimes r$. Spatial filter operator 308 operates on differential measurement signal z 318 to yield estimates of x, an estimate vector $x_{est}$ 320, in which the interference has been suppressed by applying equation (33), $x_{est}=F_O z$. As discusssed above, $F_O$ is a spatial filter matrix that can be defined using equation (34) based on knowledge of the estimated D-MIMO channel matrix $H_d$, which can be estimated using training sumbols as discussed above with reference to equations (51)-(58). Symbol detector operator 310 detects the differentially encoded symbols $\Delta\phi$ 322, for example, by applying differential detectors to the estimates of x, estimate vector $x_{est}$ 320.

Figure 4A:
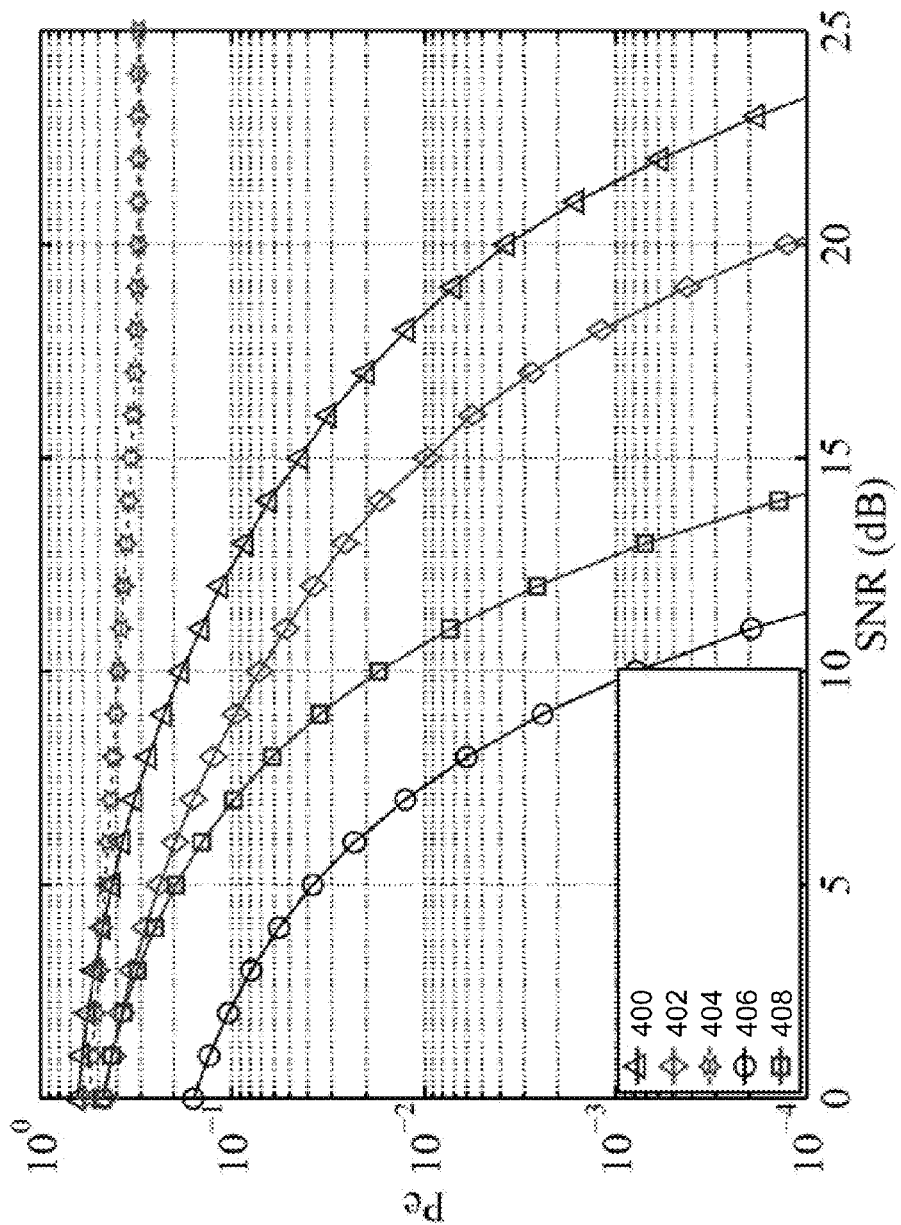
FIGS. 4a-4c illustrate the performance of five communication systems for three different levels of interference.
Figure 4B:
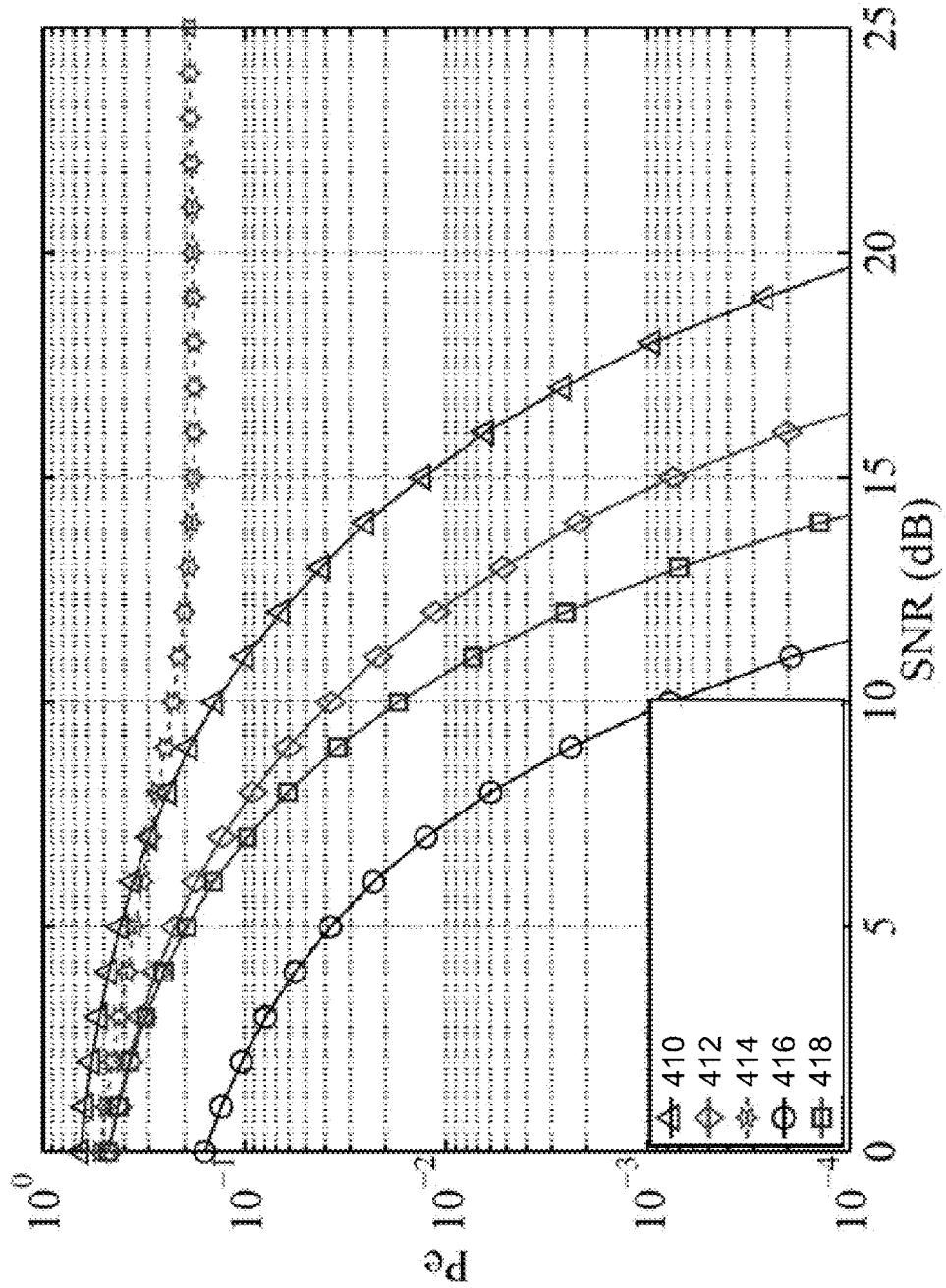
Figure 4C:
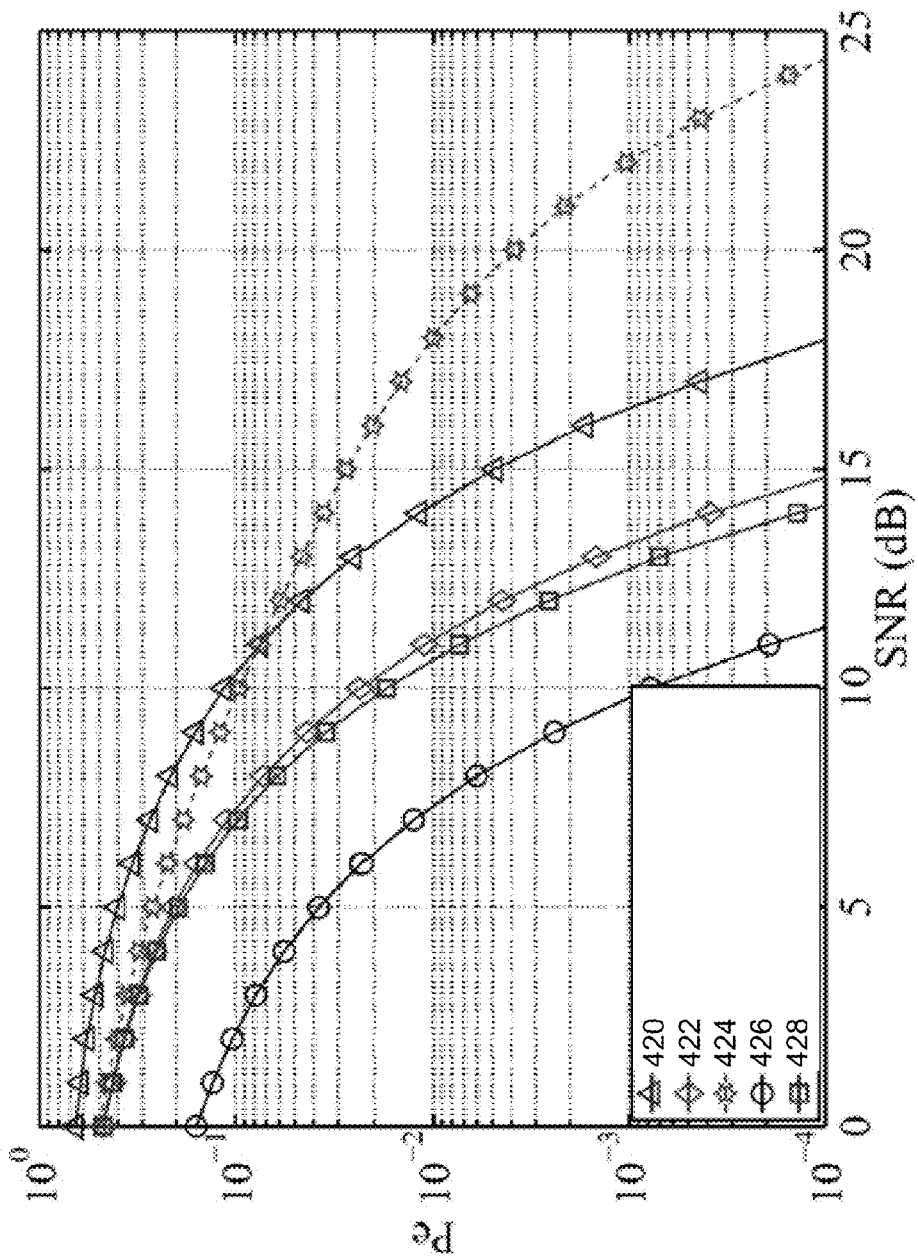

To illustrate the performance, probability of error $P_e$ versus SNR for receiver 300 implemented as an n×n MIMO system with n=2 antennas was caluclated based on uncoded QPSK differential transmissions. The $P_e$ was computed numerically from 1,000,000 symbols, and the phases of the entries of H were changed randomly every 1,000 symbols. Five different receiver systems were simulated: 1) receiver 300 based on estimating channel matrix $H_d$ using training symbols at the same SNR as that for data communication, 2) receiver 300 assuming perfect channel state information, e.g., perfect knowledge of $H_d$, 3) a receiver without interference suppression ($F_O=I_n 2$), 4) a coherent system corresponding to two non-interfering QPSK data streams, and 5) a corresponding differential system. FIGS. 4a-4c illustrate the performance of the five systems for 3 different levels of interference. In FIG. 4a, the interference is strongest: $|h_{12}|^2$ and $|h_{21}|^2$ are 3 decibels (dB) below $|h_{11}|^2=|h_{22}|^2$. In FIG. 4b, the interference is 6 dB below the signal. In FIG. 4c, the interference is 10 dB below the signal.

Referring to FIG. 4a, a first curve 400 shows the results for receiver configuration 1); a second curve 402 shows the results for receiver configuration 2); a third curve 404 shows the results for receiver configuration 3); a fourth curve 406 shows the results for receiver configuration 4); and a fifth curve 408 shows the results for receiver configuration 5). Referring to FIG. 4b, a first curve 410 shows the results for receiver configuration 1); a second curve 412 shows the results for receiver configuration 2); a third curve 414 shows the results for receiver configuration 3); a fourth curve 416 shows the results for receiver configuration 4); and a fifth curve 418 shows the results for receiver configuration 5). Referring to FIG. 4c, a first curve 420 shows the results for receiver configuration 1); a second curve 422 shows the results for receiver configuration 2); a third curve 424 shows the results for receiver configuration 3); a fourth curve 426 shows the results for receiver configuration 4); and a fifth curve 428 shows the results for receiver configuration 5). The coherent system of receiver configuration 4) exhibited the best performance. Receiver configuration 5), the differential system, had a 3 dB loss compared to the coherent system of receiver configuration 4). Receiver configuration 2) exhibited the next best performance relative to receiver configuration 5). Receiver configuration 1) exhibited the next best performance relative to receiver configuration 2). The worst performance is that of receiver configuration 3) without interference suppression. Receiver configurations 1) and 2) provide very competitive performance, whereas ignoring interference can result in unacceptably high $P_e$. Receiver configurations 4 and 5 are idealized configurations corresponding to an interference-free system for comparison.

Figure 5:
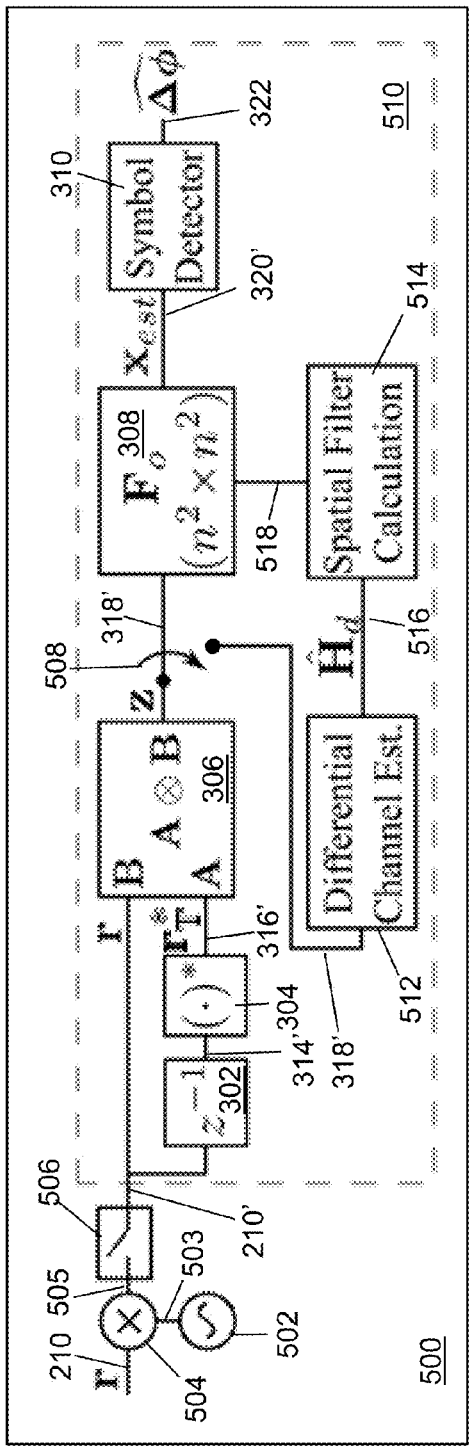
FIGS. 5-8 depict block diagrams of receiver devices in accordance with illustrative embodiments.

Referring to FIG. 5, a block diagram of a second receiver 500 that may be implemented at first transceiver 100 acting as a receiving transceiver is shown in accordance with an illustrative embodiment. Second transceiver 102 may include similar elements as understood by a person of skill in the art. Similar to receiver 300, second receiver 500 may be implemented to yield estimates of x, estimate vector $x_{est}$, in which the interference has been suppressed by defining spatial matrix $F_O$ that operates on differential measurement signal z as defined in equation (33). Second receiver 500 illustrates a completely digital implementation of receiver 300 where all of the receiver operations are performed using a DSP 510. Second receiver 500 may include a local oscillator 502, a mixer 504, an analog-to-digital converter (ADC) 506, sample and hold operator 302, conjugate operator 304, Kronecker product operator 306, spatial filter operator 308, symbol detector operator 310. Fewer, different, and additional components may be incorporated into second receiver 500.

Received signal r 210 is mixed with a local oscillator signal 503 generated by local oscillator 502 to form a mixed signal 505. Local oscillator 502 and mixer 504 downmix the received passband signal, received signal r 210, to baseband. Mixed signal 505 is input to ADC 506, which converts mixed signal 505 to a digital, baseband signal r 210'. Sample and hold operator 302, conjugate operator 304, Kronecker product operator 306, spatial filter operator 308 and symbol detector operator 310 are configured to operate on the digital, baseband version of received signal r 210.

Again, sample and hold operator 302 samples and holds a copy of a previously received digital signal $r_T$ 314'. Conjugate operator 304 computes a complex conjugate of the sampled and held previously received digital signal signal $r_T$ 314' as digital conjugate signal $r^*_T$ 316'. Kronecker product operator 306 computes a digital, differential measurement signal z 318'. Spatial filter operator 308 operates on digital, differential measurement signal z 318' to yield digital estimates of x, a digital estimate vector $x_{est}$ 320', in which the interference has been suppressed by applying equation (33), $x_{est}=F_O z$. Symbol detector operator 310 detects the differentially encoded symbols $\Delta\phi$ 322 from digital estimate vector $x_{est}$ 320'.

Second receiver 500 further may include a switch 508, a differential channel estimation operator 512, and a spatial filter calculation operator 514. Switch 508, differential channel estimation operator 512, and spatial filter calculation operator 514 may also be implemented using DSP 510. A position of switch 508 depends on whether second receiver 500 is in a channel estimation phase or a data communication phase. The data communication phase is illustrated in FIG. 5 based on the position of switch 508. In the channel estimation phase, training data, for example, as discussed with reference to equations (51)-(58), is received. In the channel estimation phase, digital, differential measurement signal z 318' generated by the training data, is provided to differential channel estimation operator 512, which computes an estimate of channel matrix $H_d$ 516 input to spatial filter calculation operator 514. Spatial filter calculation operator 514 computes spatial filter matrix $F_O$ 518 using equation (34) based on estimated channel matrix $H_d$ 516 and provides $F_O$ 518 to spatial filter operator 308 for use in the data communication phase.

Figure 6:
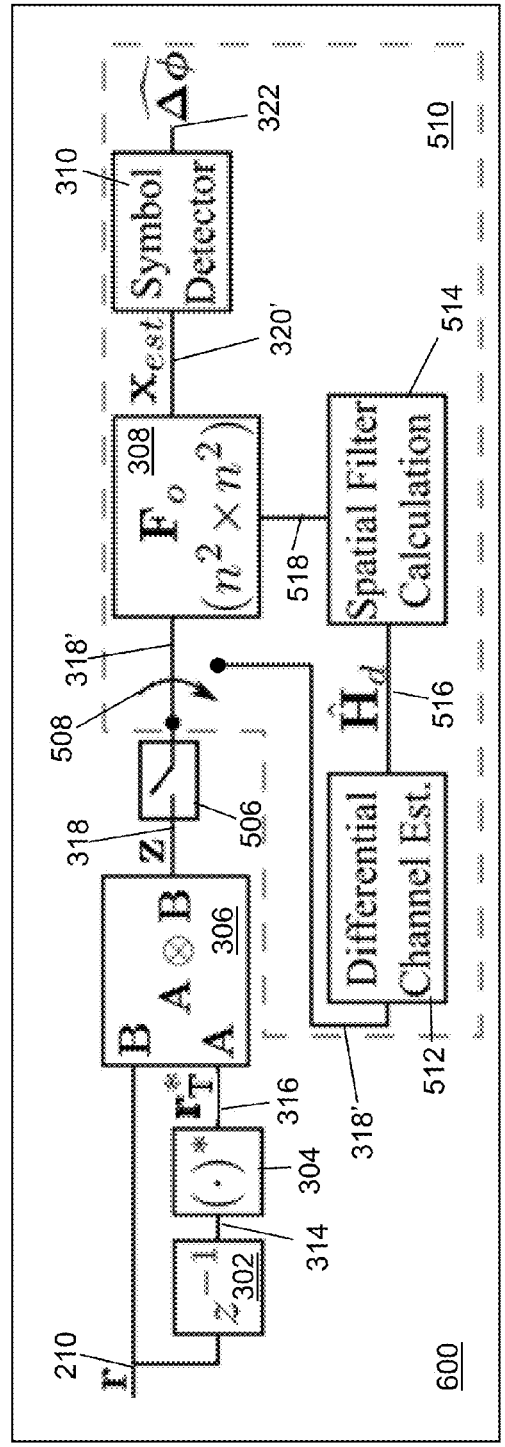

Referring to FIG. 6, a block diagram of a third receiver 600 that may be implemented at first transceiver 100 acting as a receiving transceiver is shown in accordance with an illustrative embodiment. Second transceiver 102 may include similar elements as understood by a person of skill in the art. Similar to receiver 300, third receiver 600 may be implemented to yield estimate vector $x_{est}$, in which the interference has been suppressed by defining spatial filter matrix $F_O$ that operates on differential measurement signal z 318 as defined in equation (33). Third receiver 600 illustrates an implementation in which the differential measurements, $z=\text{vec}(rr_T^H)=r_T^* \otimes r$, are performed using analog passband devices. Local oscillator 502 and mixer 504 are not needed. Third receiver 600 may include sample and hold operator 302, conjugate operator 304, Kronecker product operator 306, ADC 506, switch 508, spatial filter operator 308, symbol detector operator 310, differential channel estimation operator 512, and spatial filter calculation operator 514. Fewer, different, and additional components may be incorporated into third receiver 600.

Differential measurement signal z 318 is input to ADC 605, which converts signal z 318 to digital, differential measurement vector z 318'. The remaining receiver operators, spatial filter operator 308, symbol detector operator 310, differential channel estimation operator 512, and spatial filter calculation operator 514 are implemented using DSP 510 similar to second receiver 500.

The data communication phase is illustrated in FIG. 6 based on the position of switch 508. In the channel estimation phase, training data, for example, as discussed with reference to equations (51)-(58), is received. Switch 508 is positioned to switch digital, differential measurement signal z 318' output from ADC 506 to differential channel estimation operator 512 during the channel estimation phase. Similar to second receiver 500, in the channel estimation phase, digital, differential measurement signal z 318' generated by the training data, is provided to differential channel estimation operator 512, which computes an estimate of channel matrix $H_d$ 516 input to spatial filter calculation operator 514. Spatial filter calculation operator 514 computes spatial filter matrix $F_O$ 518 using equation (34) based on estimated channel matrix $H_d$ 516 and provides $F_O$ 518 to spatial filter operator 308 for use in the data communication phase.

Figure 7:
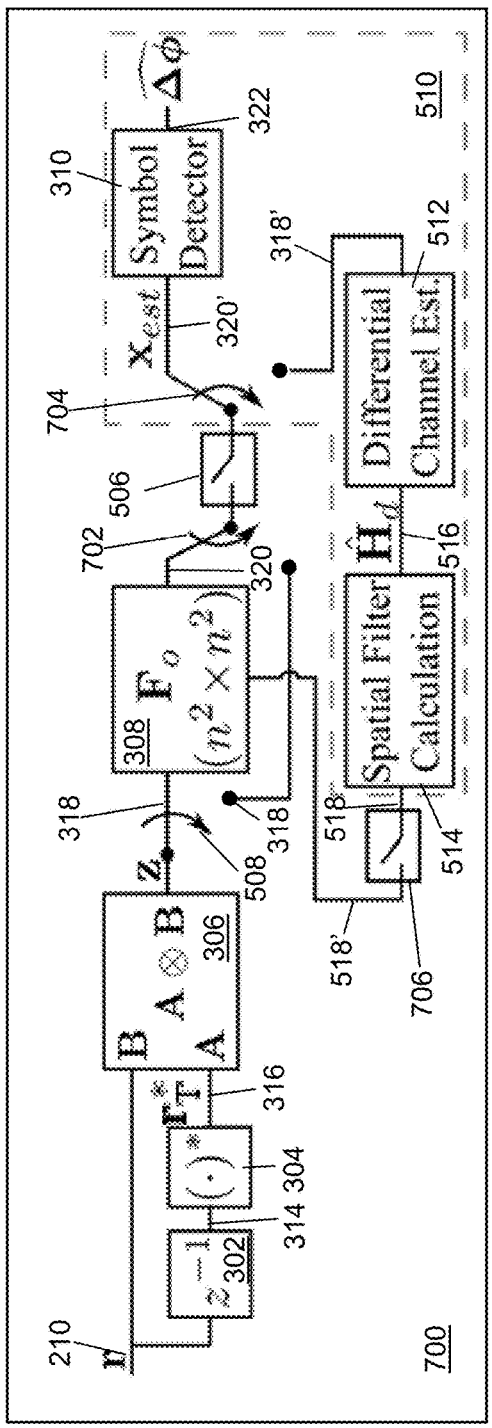

Referring to FIG. 7, a block diagram of a fourth receiver 700 that may be implemented at first transceiver 100 acting as a receiving transceiver is shown in accordance with an illustrative embodiment. Second transceiver 102 may include similar elements as understood by a person of skill in the art. Similar to receiver 300, fourth receiver 700 may be implemented to yield estimate vector $x_{est}$, in which the interference has been suppressed by defining spatial filter matrix $F_O$ that operates on differential measurement signal z 318 as defined in equation (33).

Fourth receiver 700 illustrates an implementation in which the differential measurements and the spatial filtering are performed with analog passband and baseband devices, respectively. Again, local oscillator 502 and mixer 504 are not needed. Fourth receiver 700 may include sample and hold operator 302, conjugate operator 304, Kronecker product operator 306, switch 506, spatial filter operator 308, ADC 506, symbol detector operator 310, differential channel estimation operator 512, spatial filter calculation operator 514, a second switch 702, a third switch 704, and a digitalto-analog converter (DAC) 706. Fewer, different, and additional components may be incorporated into fourth receiver 700.

Estimate vector $x_{est}$ 320 is input to ADC 506, which converts estimate vector $x_{est}$ 320 to digital estimate vector $x_{est}$ 320' that is input to symbol detector operator 310. The remaining receiver operators, symbol detector operator 310, differential channel estimation operator 512, and spatial filter calculation operator 514 are performed using DSP 510 similar to second receiver 500. Switch 508 is positioned to switch differential measurement signal z 318 between spatial filter operator 308 and differential channel estimation operator 512. Second switch 702 is positioned between spatial filter operator 308 and ADC 506. Third switch 704 is positioned between ADC 506 and symbol detector operator 310. Switch 508, second switch 702, and third switch 704 switch simultaneously so that, in the channel estimation phase, differential measurement signal z 318 is input to ADC 506 and digital, differential measurement signal z 318' is input to differential channel estimation operator 512, which computes the estimate of channel matrix $H_d$ 516 input to spatial filter calculation operator 514. Spatial filter calculation operator 514 computes spatial filter matrix $F_O$ 518 using equation (34) based on channel matrix $H_d$ 516 and provides spatial filter matrix $F_O$ 518 to DAC 706, which generates an analog, baseband spatial filter matrix $F_O$ 518' to spatial filter operator 308 for use in the data communication phase.

A quasi-coherent estimate of a second channel matrix H can be obtained from channel matrix $H_d$ and can be used for linear interference suppression on direct receiver measurements r and $r_T$, rather than on $z=\text{vec}(rr_T^H)$ followed by differential detection from appropriate elements of z. The following channel decomposition of second channel matrix H can be defined $$H=H_O \Lambda_\phi \quad (60)$$

where H is the actual channel matrix $$H = \begin{bmatrix} |h_{11}|e^{j\angle h_{11}} & |h_{12}|e^{j\angle h_{12}} \\ |h_{21}|e^{j\angle h_{21}} & |h_{22}|e^{j\angle h_{22}} \end{bmatrix}, \quad (61)$$

A third channel matrix $H_O$ is what can be estimated from channel matrix $H_d$ as defined below $$H_O = \begin{bmatrix} |h_{11}| & |h_{12}|e^{j(\angle h_{12}-\angle h_{22})} \\ |h_{21}|e^{j(\angle h_{21}-\angle h_{11})} & |h_{22}| \end{bmatrix}, \quad (62)$$

and $\Lambda_\phi$ is a diagonal matrix defined as $\Lambda_\phi=\text{diag}(e^{j\angle h_{11}},e^{j\angle h_{22}})$. $H_O$ can be estimated from $H_d$ based on equation (27). The first column of $h_{11}*H/|h_{11}|$ yields the first column of third channel matrix $H_O$. Similarly, the second column of $h_{22}*H/|h_{22}|$ yields the second column of third channel matrix $H_O$. Thus, when using the simple channel estimation approach described by equations (51) and (57), in the quasi-coherent case only the training symbols in equations (51) and (57) are needed to estimate the first and fourth columns of channel matrix $H_d$ needed to determine third channel matrix $H_O$.

An MMSE filter matrix F is defined by $$F=HH(\rho HH^H+\sigma^2 I_n)^{-1}=\Lambda_\phi^H H_O^H(\rho H_O H_O^H+\sigma^2 I_n)^{-1}=\Lambda_\phi^H F_O, \quad (63)$$

which operates on the baseband signal vector r. A second spatial filter matrix $F_O$ in equation (63) can be computed at the receiver and used for interference suppression. Thus, the processed signal vector from which the differentially encoded symbols are detected can be defined by $$y=F_O r=F_O Hs+F_O v. \quad (64)$$

The use of second spatial filter matrix $F_O$, rather than MMSE filter matrix F, does not impact the ability to detect differential symbols since the i-th differentially encoded transmitted symbol in $s_i s_{iT}$ is detected from the product $y_i y_{iT}^*$, which corresponds to detecting the differentially encoded symbol vector via $y \circ y_T^*$ where denotes the Hadamard (element-wise) product. Second spatial filter matrix $F_O$ has order (n×n) rather than the order (n²×n²) of spatial filter matrix $F_O$ defined for receivers 300, 500, 600, and 700.

Interference suppression using precoding at the transmitter is also possible. In reciprocal channels, if the transmitter first acts as a receiver and estimates the channel matrix from differential measurements based on training symbols from the receiver, the following decomposition of second channel matrix H results $$H=\Lambda_\phi H_O. \quad (65)$$

In this case, the transmitted signal may be precoded as $s \rightarrow Gs_V$ where $$F=(H^H H+\zeta I)^{-1}H^H, \zeta=\sigma^2/\rho, \quad (66)$$

where $s_V$ is the symbol vector, $\rho$ represents transmit power (SNR if $\sigma^2=1$) per data stream, and $\Lambda_s=E[ss^H]$ is a diagonal covariance matrix of transmitted symbols, which is $\Lambda_s=I$, and where tr(A) denotes the trace of a square matrix A, which is the sum of the diagonal entries of A. The composite system matrix with precoding can be defined as $$r=HGs+v \quad (67)$$

and the composite matrix HG controls the interference. In terms of third channel matrix $H_O$, F is defined by $$F=(H_O^H H_O+\zeta I)^{-1}H_O^H \Lambda_\phi^*=F_O \Lambda_\phi^* \quad (68)$$

where second spatial filter matrix $F_O$ can be computed based on third channel matrix $H_O$. The unknown phases in $\Lambda_\phi^*$ are inconsequential from the viewpoint of differential signaling, and the receiver can directly detect the symbols differentially from $z=\text{vec}(rr_T^H)$ because interference suppression is performed at the transmitter.

Figure 8:
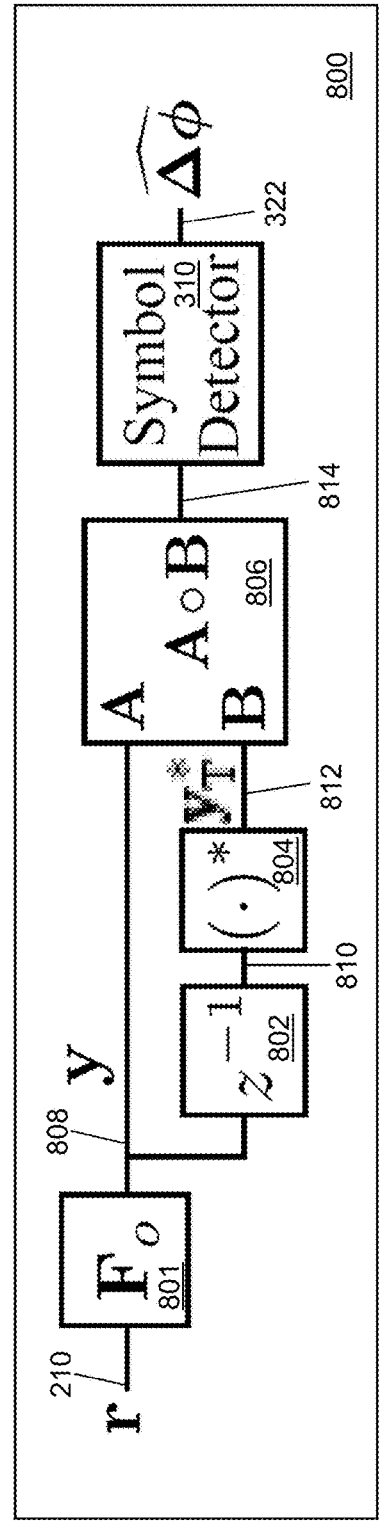

Referring to FIG. 8, a block diagram of a fifth receiver 800 that may be implemented at first transceiver 100 acting as a receiving transceiver is shown in accordance with an illustrative embodiment. Fifth receiver 800 may be referred to as an example of a quasi-coherent receiver that suppresses interference. Second transceiver 102 may include similar elements as understood by a person of skill in the art. Fifth receiver 800 may be implemented to define second spatial filter matrix $F_O$ that operates on received signal r 210 as defined in equation (64). Fifth receiver 800 may include a second spatial filter operator 801, a second sample and hold operator 802, a second conjugate operator 804, a Hadamard product operator 806, and symbol detector operator 310. Fewer, different, and additional components may be incorporated into fifth receiver 800.

Similar to sample and hold operator 302, conjugate operator 304, Kronecker product operator 306, and spatial filter operator 308, second spatial filter operator 801, second sample and hold operator 802, second conjugate operator 804, and Hadamard product operator 806 may be implemented by a special purpose computer, logic circuits, or hardware circuits (analog or digital) as understood by a person of skill in the art. Thus, second spatial filter operator 801, second sample and hold operator 802, second conjugate operator 804, and Hadamard product operator 806 may be implemented using hardware, firmware, software, or any combination of these methods. For example, second spatial filter operator 801, second sample and hold operator 802, second conjugate operator 804, and Hadamard product operator 806 may be implemented in software (comprised of computer-readable and/or computer-executable instructions) stored in a computer-readable medium and accessible by a processor for execution of the instructions that embody the operations of the associated operator. The instructions may be written using one or more programming languages, assembly languages, scripting languages, etc. Fifth receiver 800 may include one or more computer-readable media. Fifth receiver 800 may include a plurality of processors that use the same or a different processing technology.

Both Hadamard product operator 806 and Kronecker product operator 306 generate differential measurements between a current and a previous measurement. Hadamard product operator 802 performs operations $y \circ y_T^*$ where α denotes the Hadamard element-wise product.

Second spatial filter operator 801 operates on the received signal r 210 to yield $y=F_O r=F_O Hs+F_O v$. Second spatial filter matrix $F_O$ can be defined using equation (63) based on an estimate of third channel matrix $H_O$ determined using equation (62) based on an estimate of channel matrix $H_d$, which can be estimated using training symbols as discussed above with reference to equations (51)-(58). Second sample and hold operator 802 samples and holds a copy of a previously filtered signal $y_T$ 808. Second conjugate operator 804 computes a complex conjugate of the sampled and held previously filtered signal $y_T$ 810 as conjugate signal $y^*_T$ 812. Hadamard product operator 806 computes differential measurement signal $y \circ y_T^*$ 814. Symbol detector operator 310 detects the differentially encoded symbols Δϕ 322 from differential measurement signal $y \circ y_T^*$ 814, for example, by applying differential detectors.

Figure 9A:
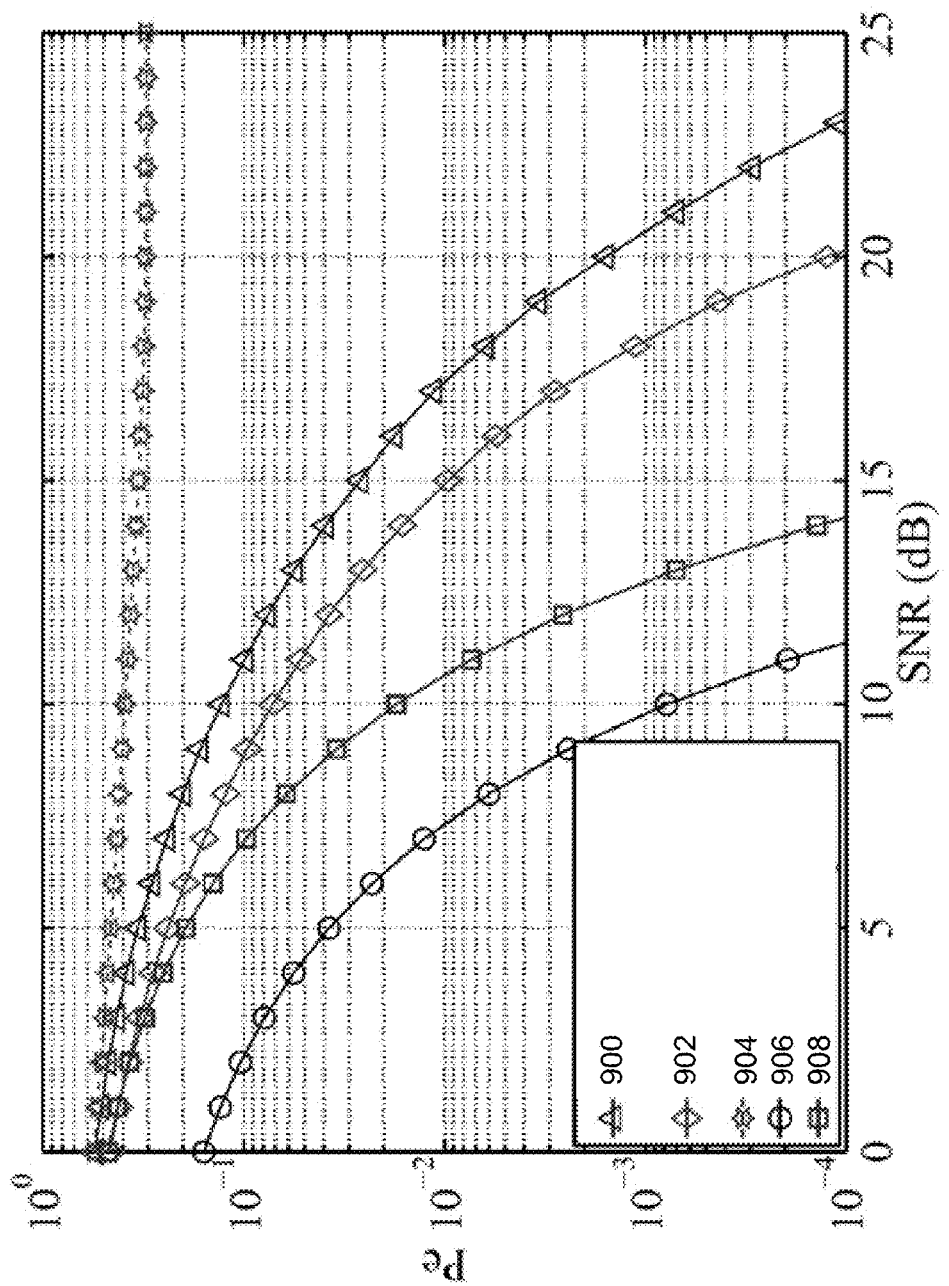
FIGS. 9a-9c illustrate the performance of five communication systems for three different levels of interference.
Figure 9B:
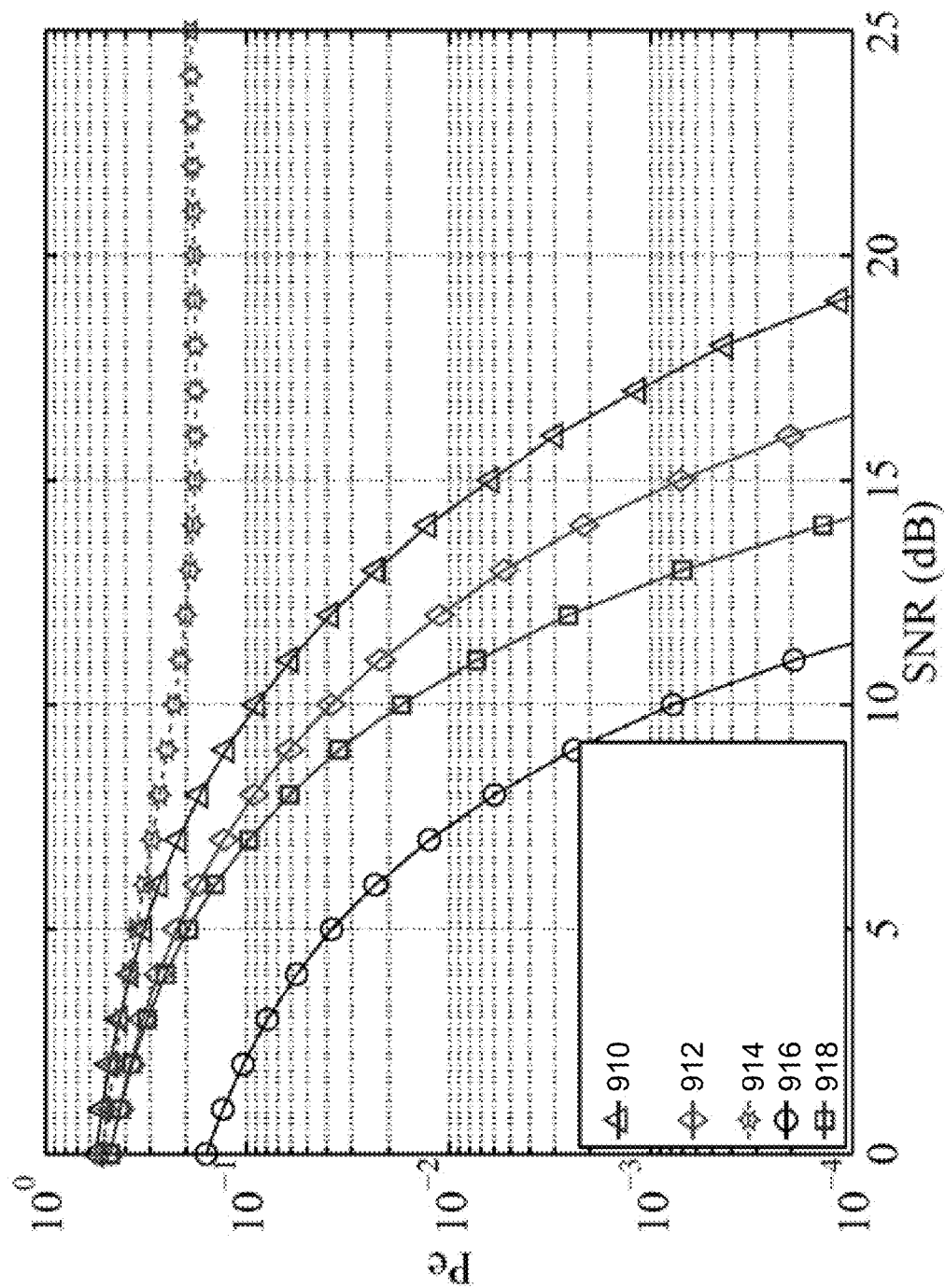
Figure 9C:
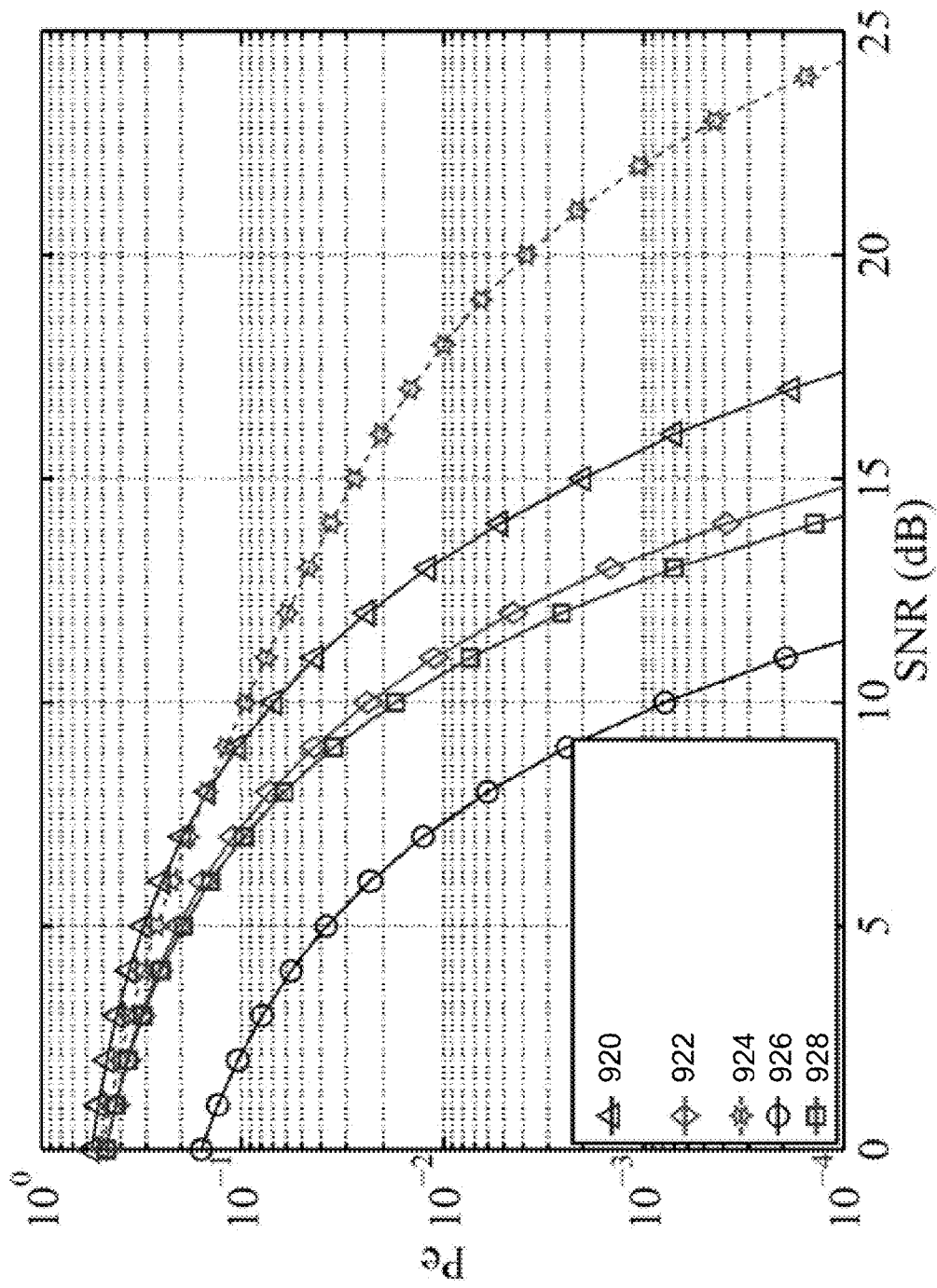

To illustrate the performance, probability of error $P_e$ versus SNR for fifth receiver 800 implemented as an n×n MIMO system with n=2 antennas was calculated based on uncoded QPSK differential transmissions. The $P_e$ was computed numerically from 1,000,000 symbols, and the phases of the entries of H were changed randomly every 1,000 symbols. Five different receiver systems were simulated: 1) fifth receiver 800 based on estimating $H_d$ using training symbols at the same SNR as that for data communication, 2) fifth receiver 800 assuming perfect channel state information, e.g., perfect knowledge of $H_d$, 3) a receiver without interference suppression ($F_O=I_{n^2}$), 4) a coherent system corresponding to two non-interfering QPSK data streams, and 5) a corresponding differential system. FIGS. 9a-9c illustrate the performance of the five systems for 3 different levels of interference.

In FIG. 9a, the interference is strongest: $|h_{12}|^2$ and $|h_{21}|^2$ are 3 decibels (dB) below $|h_{11}|^2=|h_{22}|^2$. In FIG. 9b, the interference is 6 dB below the signal. In FIG. 9c, the interference is 10 dB below the signal. Referring to FIG. 9a, a first curve 900 shows the results for receiver configuration 1); a second curve 902 shows the results for receiver configuration 2); a third curve 904 shows the results for receiver configuration 3); a fourth curve 906 shows the results for receiver configuration 4); and a fifth curve 908 shows the results for receiver configuration 5). Referring to FIG. 9b, a first curve 910 shows the results for receiver configuration 1); a second curve 912 shows the results for receiver configuration 2); a third curve 914 shows the results for receiver configuration 3); a fourth curve 916 shows the results for receiver configuration 4); and a fifth curve 918 shows the results for receiver configuration 5). Referring to FIG. 9c, a first curve 920 shows the results for receiver configuration 1); a second curve 922 shows the results for receiver configuration 2); a third curve 924 shows the results for receiver configuration 3); a fourth curve 926 shows the results for receiver configuration 4); and a fifth curve 928 shows the results for receiver configuration 5). The coherent system of receiver configuration 4) exhibited the best performance. Receiver configuration 5), the differential system, had a 3 dB loss compared to the coherent system of receiver configuration 4). Receiver configuration 2) exhibited the next best performance relative to receiver configuration 5). Receiver configuration 1) exhibited the next best performance relative to receiver configuration 2). The worst performance is that of receiver configuration 3) without interference suppression. Receiver configurations 1) and 2) provide very competitive performance, and are comparable to receiver configurations 1) and 2) using recevier 300. Receiver configuration 1) using recevier 300 performs slightly worse than receiver configuration 1) using fifth receiver 800.

FIGS. 10-13 show implementations of a quasi-coherent MIMO receiver based on fifth receiver 800. Because the quasi-coherent MIMO receiver uses cross-channel and co-channel differential measurements during the channel estimation phase and only co-channel differential measurements during the data communication phase, the Hadamard product is computed during the data communication phase and the Kronecker product is computed during the channel estimation phase.

Figure 10:
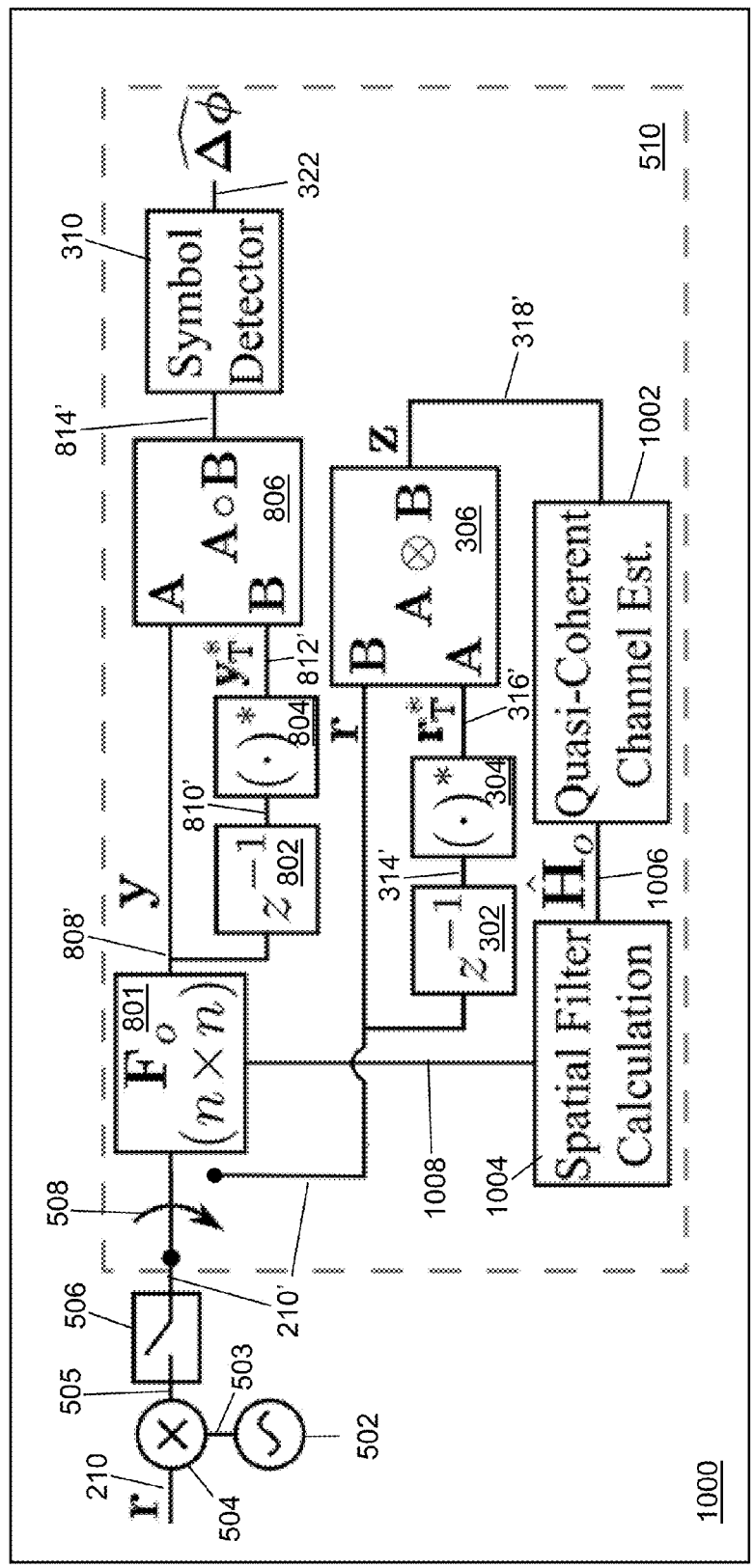
FIGS. 10-13 depict block diagrams of receiver devices in accordance with additional illustrative embodiments.

Referring to FIG. 10, a block diagram of a sixth receiver 1000 that may be implemented at first transceiver 100 acting as a receiving transceiver is shown in accordance with an illustrative embodiment. Second transceiver 102 may include similar elements as understood by a person of skill in the art. Similar to fifth receiver 800, sixth receiver 1000 may be implemented to define second spatial filter matrix $F_O$ that operates on received signal r 210 as defined in equation (64). Sixth receiver 1000 illustrates a completely digital implementation where all of the receiver operations are performed using DSP 510.

Similar to second receiver 500, sixth receiver 1000 may include local oscillator 502, mixer 504, ADC 506, and switch 508. Received signal r 210 is mixed with local oscillator signal 503 generated by local oscillator 502 to form mixed signal 505. Local oscillator 502 and mixer 504 downmix the received passband signal, received signal r 210, to baseband. Mixed signal 505 is input to ADC 506, which converts mixed signal 505 to digital, baseband signal r 210'. Similar to second receiver 500, sixth receiver 1000 further may include switch 508 that is switched between the data communication phase shown in FIG. 10 and the channel estimation phase.

Similar to fifth receiver 800, sixth receiver 1000 may include second spatial filter operator 801, second sample and hold operator 802, second conjugate operator 804, Hadamard product operator 806, and symbol detector operator 310 used in the data communication phase. Each of second spatial filter operator 801, second sample and hold operator 802, second conjugate operator 804, Hadamard product operator 806, and symbol detector operator 310 is implemented using DSP 510 and connected as discussed with reference to FIG. 8 to receive and process digital, baseband signal r 210' to detect the differentially encoded symbols Δϕ 322. The signals processed by second spatial filter operator 801, second sample and hold operator 802, second conjugate operator 804, Hadamard product operator 806, and symbol detector operator 310 are configured to operate on digital signals.

Similar to second receiver 500, sixth receiver 1000 further may include sample and hold operator 302, conjugate operator 304, Kronecker product operator 306 connected to receive and process digital, baseband signal r 210'. To support the channel estimation phase, sixth receiver 1000 further may include a quasi-coherent channel estimation operator 1002 and a second spatial filter computational operator 1004. Quasi-coherent channel estimation operator 1002 generates an estimate of third channel matrix $H_O$ 1006 from a computation of channel matrix $H_d$ based on equation (27). For example, quasi-coherent channel estimation operator 1002 first implements differential channel estimation operator 512 to estimate channel matrix $H_d$ 516 and then estimates third channel matrix $H_O$ 1006 from channel matrix $H_d$ 516. Second spatial filter computational operator 1004 computes second spatial filter matrix $F_O$ 1008 in digital form from third channel matrix $H_O$ 1006 using equation (63) and provides the computation to second spatial filter operator 801. Fewer, different, and additional components may be incorporated into sixth receiver 1000.

Figure 11:
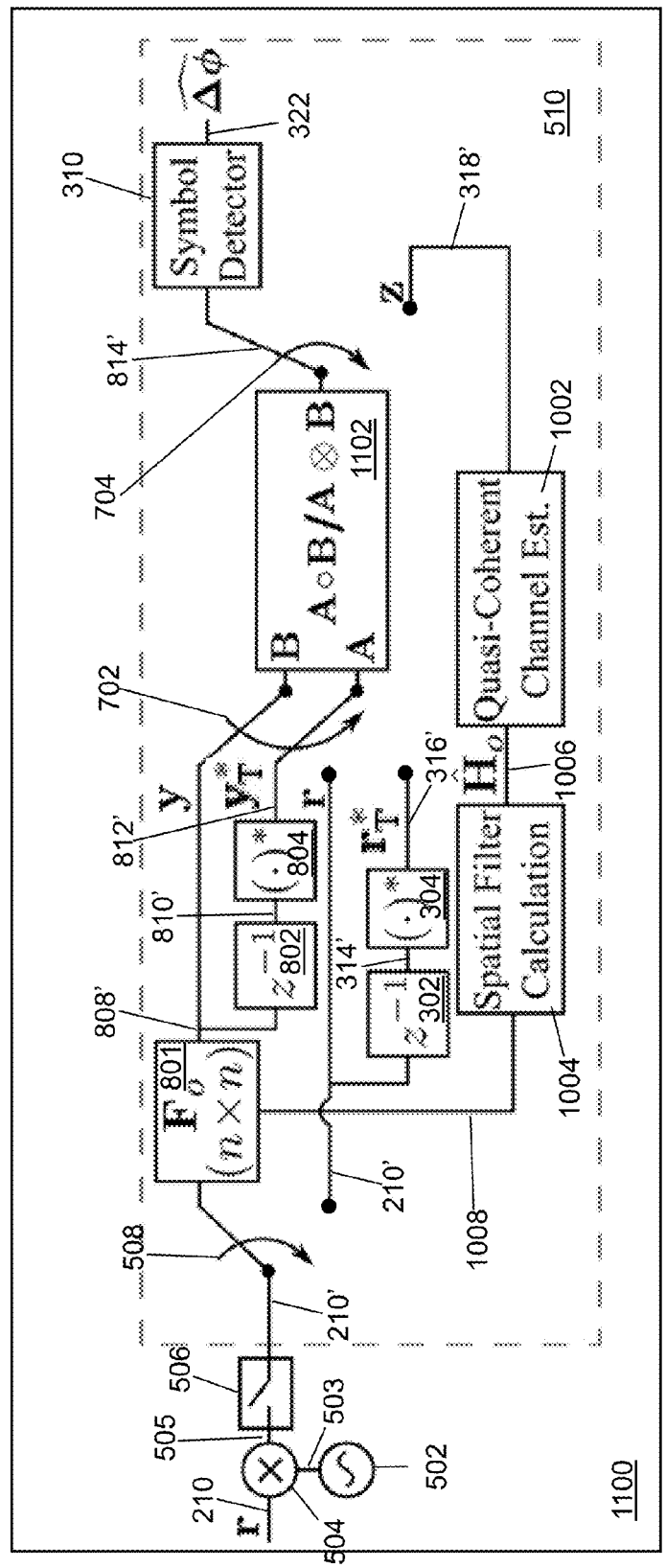

Referring to FIG. 11, a block diagram of a seventh receiver 1100 that may be implemented at first transceiver 100 acting as a receiving transceiver is shown in accordance with an illustrative embodiment. Second transceiver 102 may include similar elements as understood by a person of skill in the art. Similar to fifth receiver 800, seventh receiver 1100 may be implemented to define second spatial filter matrix $F_O$ that operates on received signal r 210 as defined in equation (64). Seventh receiver 1100 also illustrates a completely digital implementation where all of the receiver operations are performed using DSP 510.

Seventh receiver 1100 differs from sixth receiver 1000 in that seventh receiver 1100 includes a configurable product operator 1102, second switch 702, and third switch 704. Second switch 702 is positioned on an input side of configurable product operator 1102, and third switch 704 is positioned on an output side of configurable product operator 1102. Switch 508, second switch 702, and third switch 704 are switched simultaneously to switch between the data communication phase shown in FIG. 11 and the channel estimation phase. Configurable product operator 1102 is configured to perform the Hadamard product in the data communication phase and to perform the Kronecker product in the channel estimation phase. As a result, the inputs to configurable product operator 1102 are switched between the digital filtered inputs 808', 812' provided to compute the Hadamard product and the digital unfiltered inputs 210' and 316' provided to compute the Kronecker product, and the outputs from configurable product operator 1102 are switched between digital, differential measurement signal $y \circ y_T^*$ 814' and digital, differential measurement signal z 318'. Digital, differential measurement signal $y \circ y_T^*$ 814' is input to symbol detector 310. Digital, differential measurement signal z 318' is input to quasi-coherent channel estimation operator 1002.

Figure 12:
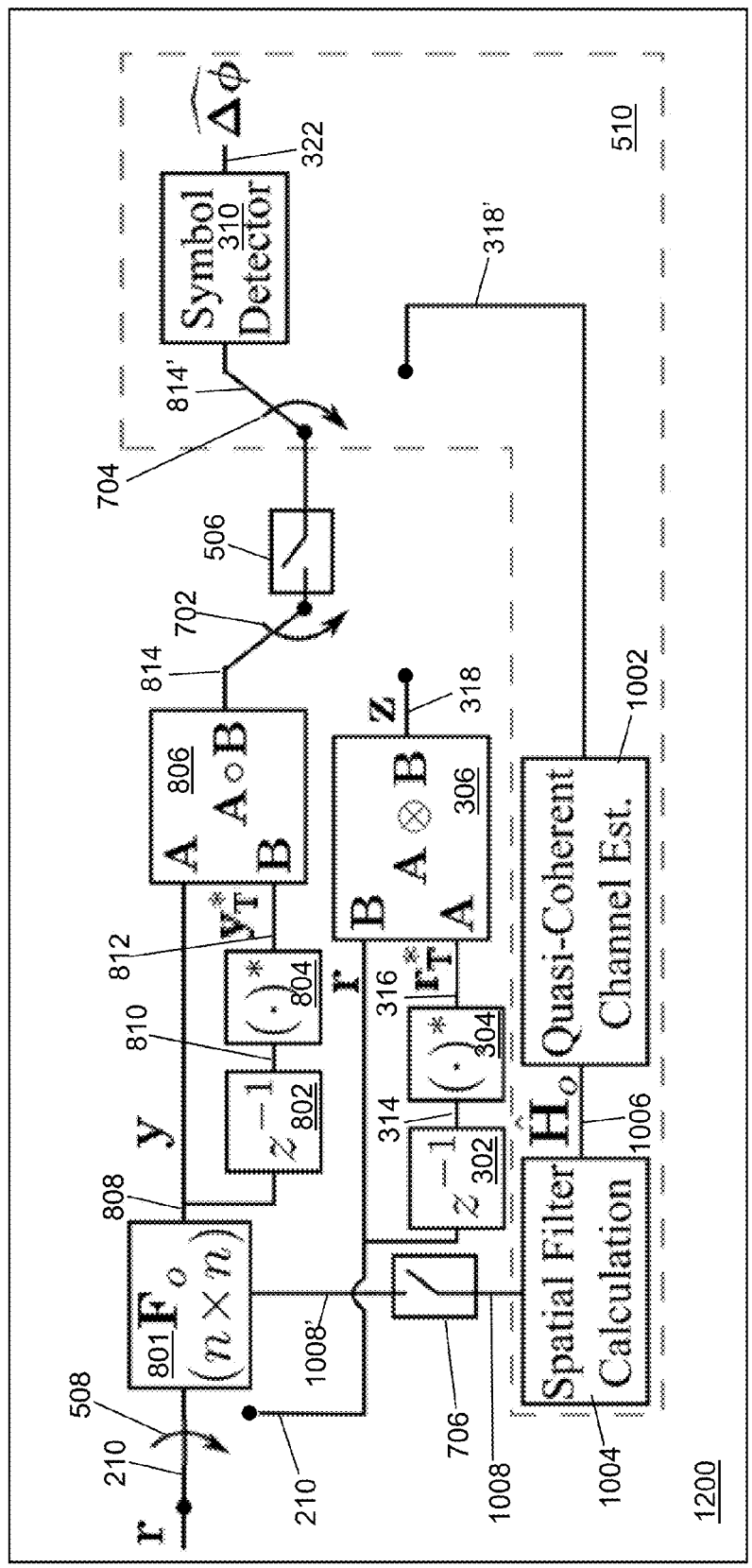

Referring to FIG. 12, a block diagram of an eighth receiver 1200 that may be implemented at first transceiver 100 acting as a receiving transceiver is shown in accordance with an illustrative embodiment. Second transceiver 102 may include similar elements as understood by a person of skill in the art. Similar to fifth receiver 800, eighth receiver 1200 may be implemented to define second spatial filter matrix $F_O$ that operates on received signal r 210 as defined in equation (64). Eighth receiver 1200 illustrates an implementation similar to fourth receiver 700 in that the spatial filtering and differential measurements are performed by analog devices, and the channel estimation, spatial filter computation, and symbol detection are performed by digital devices.

Figure 13:
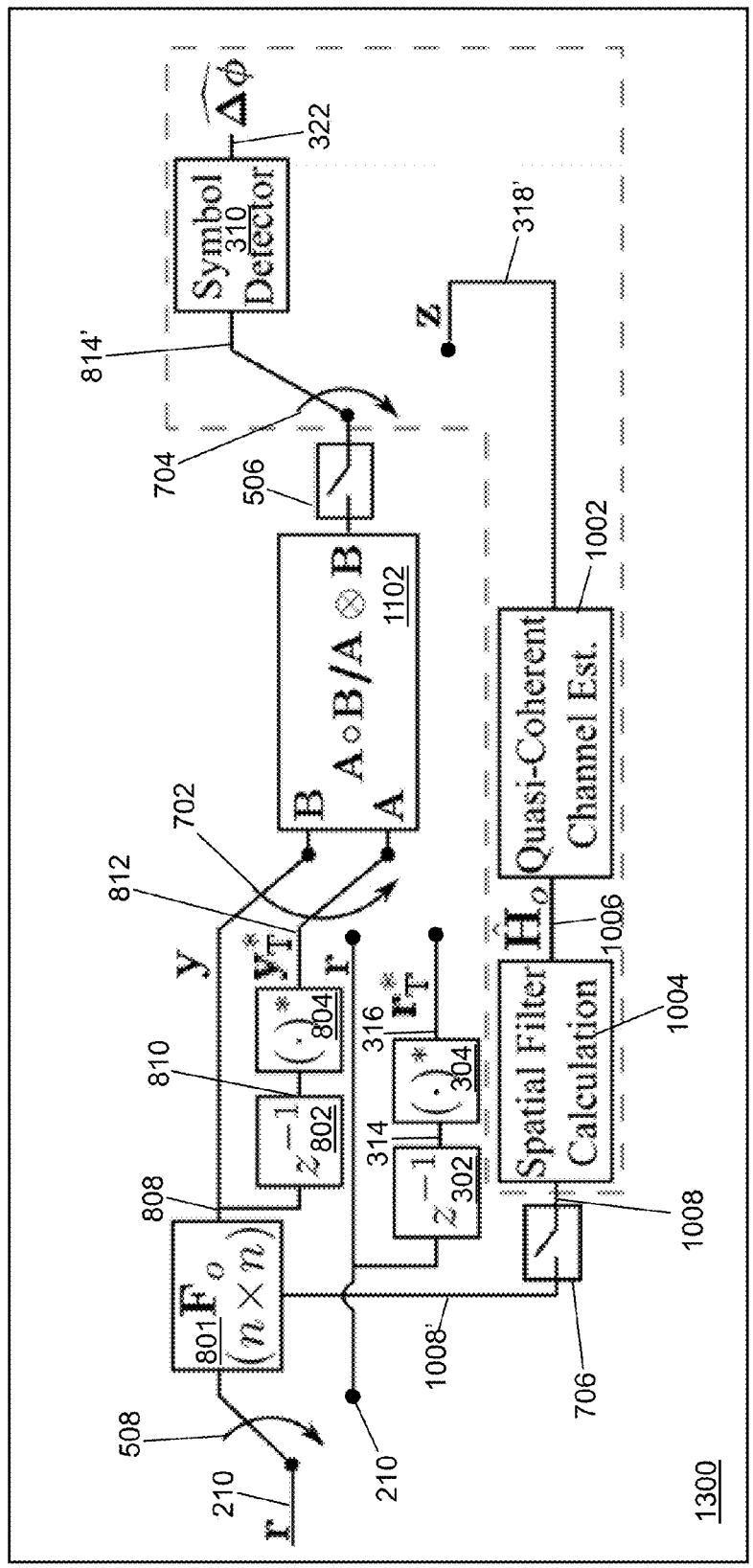

Referring to FIG. 13, a block diagram of a ninth receiver 1300 that may be implemented at first transceiver 100 acting as a receiving transceiver is shown in accordance with an illustrative embodiment. Second transceiver 102 may include similar elements as understood by a person of skill in the art. Similar to fifth receiver 800, may be implemented to define second spatial filter matrix $F_O$ that operates on received signal r 210 as defined in equation (64). Ninth receiver 1300 also illustrates an implementation similar to fourth receiver 700 in that the spatial filtering and differential measurements are performed by analog devices, and the channel estimation, spatial filter computation, and symbol detection are performed by digital devices. Ninth receiver 1300 differs from eighth receiver 1200 in that configurable product operator 1102 replaces separate Kronecker product operator 306 and Hadamard product operator 806. The inputs to configurable product operator 1102 are switched between the filtered inputs 808, 812 provided to compute the Hadamard product and the unfiltered inputs 210 and 316 provided to compute the Kronecker product, and the outputs from configurable product operator 1102 are switched between digital, differential measurement signal $y \circ y_T^*$ 814' and digital, differential measurement signal z 318'. Digital, differential measurement signal $y \circ y_T^*$ 814' is input to symbol detector 310. Digital, differential measurement signal z 318' is input to quasi-coherent channel estimation operator 1002.

FIGS. 10 and 12 show implementations where Hadamard product operator 802 and Kronecker product operator 306 are implemented separately. FIGS. 11 and 13 show implementations where Hadamard product operator 802 and Kronecker product operator 306 are implemented by configurable product operator 1102 that can be switched between full and reduced differential measurements based on the channel estimation phase or the data communication phase. FIGS. 10 and 11 illustrate completely digital implementations where all of the receiver operations are performed using DSP 510. FIGS. 12 and 13 illustrate receivers where the spatial filtering and differential measurements used for the channel estimation phase and the data communication phase are obtained using analog devices implemented in passband. In FIGS. 12 and 13, second spatial filter operator 801 is implemented in passband; whereas in FIG. 7, spatial filter operator 308 is implemented in baseband.

Selection between receivers 300, 500, 600, 700, 800, 1000, 1100, 1200, and 1300 depends on the system in which the receiver is being implemented. For existing MIMO systems equipped with local oscillators for downmixing the signal to baseband before analog to digital conversion, receivers 1000 and 1100 may be preferred due to the lower dimension (n vs $n^2$) of second spatial filter operator 801 versus spatial filter operator 308 and of quasi-coherent channel estimation operator 1002, which reduces the computational complexity. For a receiver that has no local oscillator, third receiver 600 may be perferred over eighth receiver 1200 and ninth receiver 1300 to avoid implementation of second spatial filter operator 801 in passband, which may offset the increased computational complexity of third receiver 600.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, in the detailed description, using "and" or "or" is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A method of estimating a spatial filter matrix, the method comprising:
   (a) receiving a first signal by a receiver, the first signal received from a first plurality of antennas, wherein the first signal is a result of a first transmitted signal transmitted by a second plurality of antennas;
   (b) computing a conjugate of the received first signal to define a conjugate first signal;
   (c) receiving a second signal by the receiver from the first plurality of antennas, wherein the second signal is received after the first signal, wherein the second signal is a result of a second transmitted signal transmitted by the second plurality of antennas;
   (d) computing a Kronecker product of the defined conjugate first signal and the received second signal to define a differential measurement signal;
   (e) repeating (a) to (d) for a plurality of first and second signals sufficient to compute an estimate of a channel matrix;
   computing the estimate of the channel matrix from the differential measurement signals defined in (d); and
   computing a spatial filter matrix from the computed estimate of the channel matrix;
   wherein the computed spatial filter matrix is used in a data communication phase between the first plurality of antennas and the second plurality of antennas.

2. The method of claim 1, wherein the differential measurement signal is computed using $r^*_T \otimes r$, where $r^*_T$ is the defined conjugate first signal and r is the received second signal, and $\otimes$ indicates the Kronecker product.

3. The method of claim 1, wherein each pair of first and second signals is selected so that a single column of the channel matrix is estimated from the associated differential measurement signal defined in (d).

4. The method of claim 1, wherein the spatial filter matrix is computed using $H_d^H(\rho^2 H_d H_d^H + \Sigma_w)^{-1}$, where $H_d$ is the estimated channel matrix, $H_d^H$ is a hermitian matrix computed from $H_d$, $\rho$ is a signal to noise ratio, $\Sigma_w$ is a covariance matrix of w, and w is a noise vector.

5. The method of claim 1, further comprising, in the data communication phase:
   receiving a third signal by the receiver, the third signal received from the first plurality of antennas, wherein the third signal is a result of a third transmitted signal transmitted by the second plurality of antennas;
   computing a conjugate of the received third signal to define a conjugate third signal;
   receiving a fourth signal by the receiver from the first plurality of antennas, wherein the fourth signal is a result of a fourth transmitted signal transmitted by the second plurality of antennas, wherein the fourth signal is received after the third signal;
   computing a Kronecker product of the defined conjugate third signal and the received fourth signal to define a second differential measurement signal;
   spatially filtering the defined second differential measurement signal using the computed spatial filter matrix to define an estimate vector; and
   detecting a plurality of information symbols from the defined estimate vector.

6. The method of claim 1, wherein the spatial filter matrix is computed using $H_O^H(\rho H_O H_O^H + \sigma^2 I_n)^{-1}$, where $H_O$ is the estimated channel matrix, $H_O^H$ is a hermitian matrix computed from $H_O$, $\rho$ is a signal to noise ratio, $\sigma^2$ is noise power, and $I_n$ is an identity matrix.

7. The method of claim 6, wherein each pair of first and second signals is selected so that a single column of a first channel matrix is estimated from the associated differential measurement signal defined in (d).

8. The method of claim 7, wherein $H_O$ is computed from the estimated first channel matrix.

9. The method of claim 6, further comprising, in the data communication phase:
   receiving a third signal by the receiver, the third signal received from the first plurality of antennas, wherein the third signal is a result of a third transmitted signal transmitted by the second plurality of antennas;
   spatially filtering the received third signal using the computed spatial filter matrix to define a first filtered signal; and
   computing a conjugate of the first filtered signal to define a conjugate first filtered signal;
   receiving a fourth signal by the receiver from the first plurality of antennas, wherein the fourth signal is a result of a fourth transmitted signal transmitted by the second plurality of antennas, wherein the fourth signal is received after the third signal;
   spatially filtering the received fourth signal using the computed spatial filter matrix to define a second filtered signal; and
   computing a Hadamard product of the defined second filtered signal and the defined, conjugate first filtered signal to define a second differential measurement signal; and
   detecting a plurality of information symbols from the defined second differential measurement signal.

10. A receiver comprising:
    a processor configured to
    (a) receive a first signal, the first signal received from a first plurality of antennas, wherein the first signal is a result of a first transmitted signal transmitted by a second plurality of antennas;
    (b) compute a conjugate of the received first signal to define a conjugate first signal;
    (c) receive a second signal from the first plurality of antennas, wherein the second signal is received after the first signal, wherein the second signal is a result of a second transmitted signal transmitted by the second plurality of antennas;
    (d) compute a Kronecker product of the defined conjugate first signal and the received second signal to define a differential measurement signal;

(e) repeat (a) to (d) for a plurality of first and second signals sufficient to compute an estimate of a channel matrix;
compute the estimate of the channel matrix from the differential measurement signals defined in (d); and
compute a spatial filter matrix from the computed estimate of the channel matrix;
wherein the computed spatial filter matrix is used in a data communication phase between the first plurality of antennas and the second plurality of antennas.

11. The receiver of claim 10, wherein the differential measurement signal is computed using $r^*_T \otimes r$, where $r^*_T$ is the defined conjugate first signal and r is the received second signal, and $\otimes$ indicates the Kronecker product.

12. The receiver of claim 10, wherein each pair of first and second signals is selected so that a single column of the channel matrix is estimated from the associated differential measurement signal defined in (d).

13. The receiver of claim 10, wherein the spatial filter matrix is computed using $H_d^H(\rho^2 H_d H_d^H + \Sigma_w)^{-1}$, where $H_d$ is the estimated channel matrix, $H_d^H$ is a hermitian matrix computed from $H_d$, $\rho$ is a signal to noise ratio, $\Sigma_w$ is a covariance matrix of w, and w is a noise vector.

14. The receiver of claim 10, wherein the processor is further configured to, in the data communication phase:
receive a third signal by the receiver, the third signal received from the first plurality of antennas, wherein the third signal is a result of a third transmitted signal transmitted by the second plurality of antennas;
compute a conjugate of the received third signal to define a conjugate third signal;
receive a fourth signal by the receiver from the first plurality of antennas, wherein the fourth signal is a result of a fourth transmitted signal transmitted by the second plurality of antennas, wherein the fourth signal is received after the third signal;
compute a Kronecker product of the defined conjugate third signal and the received fourth signal to define a second differential measurement signal;
spatially filter the defined differential measurement signal using the computed spatial filter matrix to define an estimate vector; and
detect a plurality of information symbols from the defined estimate vector.

15. The receiver of claim 10, wherein the spatial filter matrix is computed using $H_O^H(\rho H_O H_O^H + \sigma^2 I_n)^{-1}$, where $H_O$ is the estimated channel matrix, $H_O^H$ is a hermitian matrix computed from $H_O$, $\rho$ is a signal to noise ratio, $\sigma^2$ is noise power, and $I_n$ is an identity matrix.

16. The receiver of claim 15, wherein each pair of first and second signals is selected so that a single column of a first channel matrix is estimated from the associated differential measurement signal defined in (d).

17. The receiver of claim 16, wherein $H_O$ is computed from the estimated first channel matrix.

18. The receiver of claim 15, wherein the processor is further configured to, in the data communication phase:
receive a third signal by the receiver, the third signal received from the first plurality of antennas, wherein the third signal is a result of a third transmitted signal transmitted by the second plurality of antennas, wherein the third signal includes a first transmitted symbol;
spatially filter the received third signal using the computed spatial filter matrix to define a first filtered signal; and
compute a conjugate of the first filtered signal to define a conjugate first filtered signal;
receive a fourth signal by the receiver from the first plurality of antennas, wherein the fourth signal is a result of a fourth transmitted signal transmitted by the second plurality of antennas, wherein the fourth signal includes a second transmitted symbol, wherein the fourth signal is received after the third signal;
spatially filter the received fourth signal using the computed spatial filter matrix to define a second filtered signal; and
compute a Hadamard product of the defined second filtered signal and the defined, conjugate first filtered signal to define a second differential measurement signal; and
detect a plurality of information symbols from the defined second differential measurement signal.

19. A transmitter comprising:
a processor configured to
(a) receive a first signal, the first signal received from a first plurality of antennas, wherein the first signal is a result of a first transmitted signal transmitted by a second plurality of antennas;
(b) compute a conjugate of the received first signal to define a conjugate first signal;
(c) receive a second signal from the first plurality of antennas, wherein the second signal is received after the first signal, wherein the second signal is a result of a second transmitted signal transmitted by the second plurality of antennas;
(d) compute a Kronecker product of the defined conjugate first signal and the received second signal to define a differential measurement signal;
(e) repeat (a) to (d) for a plurality of first and second signals sufficient to compute an estimate of a channel matrix;
compute the estimate of the channel matrix from the differential measurement signals defined in (d);
compute a spatial filter matrix from the computed estimate of the channel matrix; and
transmit a third signal to the second plurality of antennas, wherein the third signal is precoded using the computed spatial filter matrix.

20. The transmitter of claim 19, wherein the third signal is precoded as $s \rightarrow G s_V$, where s is the transmitted third signal, $s_V$ is a symbol vector, $G=\alpha F$, $\alpha=\sqrt{\rho/tr(F\Lambda_s F^H)}$, F is the computed spatial filter matrix, $\rho$ is a signal to noise ratio, $\Lambda_s = E[s_V s_V^H]$ is a diagonal covariance of transmitted symbol vectors, $F^H$ is a hermitian matrix computed from F, and tr(A) denotes a trace of a square matrix A, which is a sum of diagonal entries of A.

* * * * *

UNITED STATES PATENT AND TRADEMARK OFFICE
CERTIFICATE OF CORRECTION

PATENT NO. : 9,843,417 B2
APPLICATION NO. : 14/619612
DATED : December 12, 2017
INVENTOR(S) : Akbar M. Sayeed et al.

Page 1 of 1

It is certified that error appears in the above-identified patent and that said Letters Patent is hereby corrected as shown below:

In the Specification

Column 6, Line 11
Delete "$\not\equiv \varphi_1$" and replace with --$\Delta \varphi_1$--

Column 6, Line 31
Delete "$v_t \sim CM(0, \sigma^2 I_n)$" and replace with --$v_t \sim CN(0, \sigma^2 I_n)$--

Column 14, Line 11
Delete "where denotes" and replace with --where ∘ denotes--

Column 14, Line 24
Add --$G = \alpha F$, $\alpha = \sqrt{\rho/\text{tr}(F\Lambda_s F^H)}$-- after "In this case, the transmitted signal may be precoded as s→Gsv where"

Column 15, Line 19
Delete "where α" and replace with --where ∘--

Signed and Sealed this
Twenty-eighth Day of August, 2018

Andrei Iancu
*Director of the United States Patent and Trademark Office*